(12) United States Patent
Katz

(10) Patent No.: US 10,817,067 B2
(45) Date of Patent: Oct. 27, 2020

(54) SYSTEMS AND METHODS OF DIRECT POINTING DETECTION FOR INTERACTION WITH A DIGITAL DEVICE

(71) Applicant: EYESIGHT MOBILE TECHNOLOGIES LTD., Herzliya (IL)

(72) Inventor: Itay Katz, Tel Aviv (IL)

(73) Assignee: Eyesight Mobile Technologies Ltd., Herzliya (IL)

( * ) Notice: Subject to any disclaimer, the term of this patent is extended or adjusted under 35 U.S.C. 154(b) by 0 days.

(21) Appl. No.: 15/845,146

(22) Filed: Dec. 18, 2017

(65) Prior Publication Data

US 2019/0004611 A1  Jan. 3, 2019

Related U.S. Application Data

(63) Continuation of application No. 14/392,276, filed as application No. PCT/IB2014/002318 on Jun. 27, 2014, now Pat. No. 9,846,486.

(Continued)

(51) Int. Cl.
*G06F 3/01* (2006.01)
*H04N 13/383* (2018.01)
*G06F 3/03* (2006.01)

(52) U.S. Cl.
CPC ............ *G06F 3/017* (2013.01); *G06F 3/013* (2013.01); *G06F 3/0304* (2013.01); *H04N 13/383* (2018.05)

(58) Field of Classification Search
CPC .......... G06F 3/013; G06F 3/011; G06F 3/017; G06F 3/005; G06F 3/012; G06F 3/04842; G06F 3/0346
See application file for complete search history.

(56) References Cited

U.S. PATENT DOCUMENTS 6,531,999 B1   3/2003  Trajkovic
6,600,475 B2 *  7/2003  Gutta ................... G06F 3/0304
                                                345/156

(Continued)

FOREIGN PATENT DOCUMENTS

JP   2005-138755   6/2005
JP   2013-521576   2/2011

(Continued)

*Primary Examiner* — Sanjiv D. Patel
(74) *Attorney, Agent, or Firm* — Finnegan, Henderson, Farabow, Garrett & Dunner LLP

(57) ABSTRACT

Systems, methods, and non-transitory computer-readable media are disclosed. For example, a touch-free gesture recognition system is disclosed that includes at least one processor. The processor may be configured to enable presentation of first display information to a user to prompt a first touch-free gesture at at least a first location on a display. The processor may also be configured to receive first gesture information from at least one image sensor corresponding to a first gesturing location on the display correlated to a first touch-free gesture by the user, wherein the first gesturing location differs from a location of the first display information at least in part as a result of one eye of the user being dominant over another eye of the user. In addition, the processor may be configured to determine a first offset associated with the location of the first display information and the first gesturing location. Further, the processor may be configured to enable presentation of second information to prompt the user to make a subsequent touch-free gesture at at least a second location on the display. Additionally, the processor may be configured to receive subsequent gesture information from at least one image sensor corresponding to a subsequent touch-free gesture by the user. Also, the processor may be configured to use the first offset to determine a location on the display affected by the subsequent touch-free gesture.

28 Claims, 19 Drawing Sheets

Related U.S. Application Data

(60) Provisional application No. 61/840,447, filed on Jun. 27, 2013.

(56) References Cited

U.S. PATENT DOCUMENTS

| | | |
|---|---|---|
| 8,947,351 B1 | 2/2015 | Noble |
| 9,377,867 B2 | 6/2016 | Katz et al. |
| 2008/0042981 A1 | 2/2008 | Katz |
| 2010/0188355 A1* | 7/2010 | Sugita ............... G06F 3/012 345/173 |
| 2011/0228051 A1 | 9/2011 | Dedeoglu et al. |
| 2012/0001875 A1 | 1/2012 | Li et al. |
| 2012/0083312 A1 | 4/2012 | Kim |
| 2012/0206333 A1* | 8/2012 | Kim ............... G06F 3/013 345/156 |
| 2012/0320047 A1 | 12/2012 | Yanagita et al. |
| 2013/0002551 A1 | 1/2013 | Imoto et al. |
| 2013/0002661 A1* | 1/2013 | Tanaka ............ H04N 13/128 345/419 |
| 2013/0106694 A1* | 5/2013 | Tanaka ............... G03B 35/18 345/157 |
| 2013/0127980 A1 | 5/2013 | Haddick et al. |
| 2013/0156265 A1* | 6/2013 | Hennessy ............. A61B 3/113 382/103 |
| 2013/0343607 A1* | 12/2013 | Wilf .................. G06F 3/017 382/103 |
| 2014/0282269 A1 | 9/2014 | Strutt et al. |
| 2015/0035746 A1* | 2/2015 | Cockburn ............. G06F 3/013 345/156 |
| 2015/0145762 A1* | 5/2015 | Shimura ............. G06F 3/017 345/156 |

FOREIGN PATENT DOCUMENTS

| | | |
|---|---|---|
| JP | 2013-250882 | 12/2013 |
| JP | 2016-523420 | 8/2016 |
| WO | WO 2011/106798 A1 | 9/2011 |
| WO | WO 2015/008164 A2 | 1/2015 |

* cited by examiner

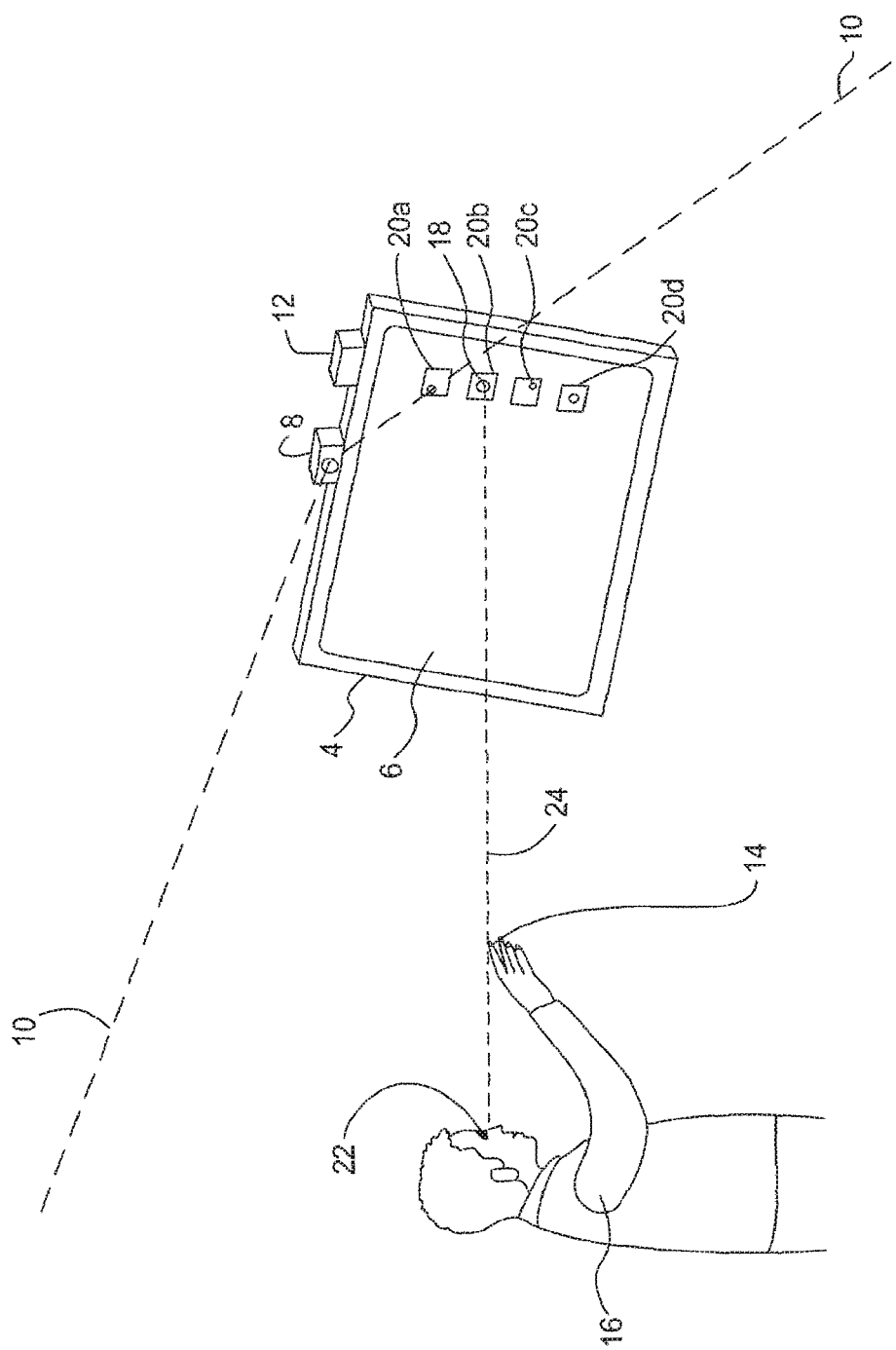

$$\frac{C}{D} = \frac{A}{B}$$

(12) United States Patent — US 10,817,067 B2

SYSTEMS AND METHODS OF DIRECT POINTING DETECTION FOR INTERACTION WITH A DIGITAL DEVICE

RELATED APPLICATIONS

This applications claims priority to U.S. provisional application No. 61/840,447, filed Jun. 27, 2013, which is incorporated herein by reference in its entirety.

TECHNICAL FIELD

The present disclosure relates to the field of touch-free gesture detection and, more particularly, devices and computer-readable media for using a sensor to detect touch-free gestures.

BACKGROUND

Permitting a user to interact with a device or an application running on a device is useful in many different settings. For example, keyboards, mice, and joysticks are often included with electronic systems to enable a user to input data, manipulate data, and cause a processor of the system to execute a variety of other actions. Increasingly, however, touch-based input devices, such as keyboards, mice, and joysticks, are being replaced by, or supplemented with devices that permit touch-free user interaction. For example, a system may include an image sensor to capture images of a user, including, for example, a user's hand and/or fingers. A processor may be configured to receive such images and initiate actions based on touch-free gestures performed by the user. It is desirable to improve upon techniques for detecting and inputting touch-free gestures.

SUMMARY

In one disclosed embodiment, a touch-free gesture recognition system is disclosed. The touch-free gesture recognition system may include at least one processor. The at least one processor may be configured to enable presentation of first display information to a user to prompt a first touch-free gesture at at least a first location on a display, receive first gesture information from at least one image sensor corresponding to a first gesturing location on the display correlated to a first touch-free gesture by the user, wherein the first gesturing location differs from a location of the first display information at least in part as a result of one eye of the user being dominant over another eye of the user, determine a first offset associated with the location of the first display information and the first gesturing location, enable presentation of second information to prompt the user to make a subsequent touch-free gesture at at least a second location on the display, receive subsequent gesture information from the at least one image sensor corresponding to a subsequent touch-free gesture by the user, and use the first offset to determine a location on the display affected by the subsequent touch-free gesture.

Additional aspects related to the embodiments will be set forth in part in the description which follows, and in part will be understood from the description, or may be learned by practice of the disclosed embodiments.

It is to be understood that both the foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several exemplary embodiments of the invention and together with the description, serve to explain the principles of the invention.

FIG. 1 illustrates an example graphical representation of a touch-free user interface system in accordance with some of the disclosed embodiments.

DETAILED DESCRIPTION

Figure 2A:
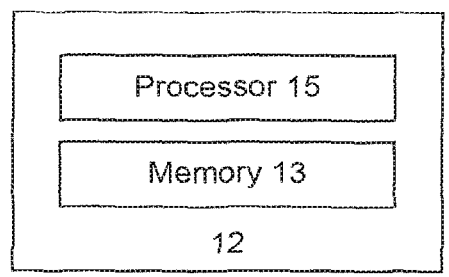
FIG. 2A illustrates an exemplary processing unit of a touch-free user interface in accordance with some of the disclosed embodiments.

Reference will now be made in detail to the exemplary embodiments, which are illustrated in the accompanying drawings. Wherever possible, the same reference numbers will be used throughout the drawings to refer to the same or like parts.

FIG. 1 depicts an embodiment of a system 2 for touch-free operation of a device 4 having a display 6. The device 4 may include, for example, a mobile phone, smart-glasses, a personal computer (PC), an entertainment device, a set top box, a television, a mobile game machine, a tablet computer, an e-reader, a portable game console, a portable computer such as a laptop or ultrabook, a home appliance such as a kitchen appliance, a communication device, an air conditioning thermostat, a docking station, a game machine such as a mobile video gaming device, a digital camera, a watch, an entertainment device, speakers, a Smart Home device, a media player or media system, a location-based device, a pico projector or an embedded projector, a medical device such as a medical display device, a vehicle, an in-car/in-air infotainment system, a navigation system, a wearable device, an augmented reality-enabled device, wearable goggles, a robot, interactive digital signage, a digital kiosk, a vending machine, an automated teller machine (ATM), or any other apparatus or system that may receive data from a user or output data to a user.

The display 6 may include any plane, surface, or other instrumentality capable of causing a display of images or other visual information. Further, the display 6 may include any type of projector that projects images or visual information onto a plane or surface. For example, the display 6 may include one or more of a television set, computer monitor, head-mounted display, broadcast reference monitor, a liquid crystal display (LCD) screen, a light-emitting diode (LED) based display, an LED-backlit LCD display, a cathode ray tube (CRT) display, an electroluminescent (ELD) display, an electronic paper/ink display, a plasma display panel, an organic light-emitting diode (OLED) display, thin-film transistor display (TFT), High-Performance Addressing display (HPA), a surface-conduction electron-emitter display, a quantum dot display, an interferometric modulator display, a swept-volume display, a carbon nanotube display, a variforcal mirror display, an emissive volume display, a laser display, a holographic display, a light field display, a wall, a three-dimensional display, an e-ink display, and any other electronic device for outputting visual information. The display 6 may include or be part of a touch screen. FIG. 1 depicts display 6 as part of device 4. However, in alternative embodiments, display 6 may be external to device 4.

The system 2 may also include (or receive information from) an image sensor 8 positioned adjacent to the device 4 and configured to obtain images of a three-dimensional (3-D) viewing space bounded by the broken lines 10. The image sensor 8 may include any image acquisition device including, for example, one or more of a camera, a light sensor, an infrared (IR) sensor, an ultrasonic sensor, a proximity sensor, a CMOS image sensor, a shortwave infrared (SWIR) image sensor, or a reflectivity sensor, a CCD image sensor, a reflectivity sensor, a depth video system comprising a 3-D image sensor or two or more two-dimensional (2-D) stereoscopic image sensors, and any other device that is capable of sensing visual characteristics of an environment. By way of example, FIG. 1 depicts the image sensor 8 adjacent to the device 4, but in alternative embodiments, the image sensor 8 may be incorporated into the device 4 or even located away from the device 4.

A user 16 situated in the viewing space indicated by the broken lines 10 may appear in images obtained by the image sensor 8. The image sensor 8 may output 2-D or 3-D monochrome, color, or IR video to a processing unit 12, which may be integral with the image sensor 8 or connected to the image sensor 8 by a wired or wireless communication channel.

Embodiments of the invention may include at least one processor. As used herein, the term "processor" may include an electric circuit that performs a logic operation on an input or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA), an application-specific integrated circuit (ASIC), or any other circuit suitable for executing instructions or performing logic operations. The at least one processor may be coincident with or may constitute any part of a processing unit, such as, for example, processing unit 12 depicted in FIG. 2A. The processing unit 12 of FIG. 2A may include, among other things, a processor 15 and memory 13 that may be used for storing images obtained by the image sensor 8. The processing unit 12 and/or the processor 15 may be configured to execute one or more instructions that reside in the processor 15 and/or the memory 13.

The memory 13 may include, for example, one or more of persistent memory, ROM, EEPROM, EAROM, flash memory devices, magnetic disks, magneto optical disks, CD-ROM, DVD-ROM, Blu-ray media, and may contain instructions (i.e., software or firmware) and/or other data. FIG. 2A depicts the memory 13 as part of the processing unit 12, but in other embodiments the memory 13 may be external to the processing unit 12.

The processing unit 12 may be configured to analyze images obtained by the image sensor 8 and track one or more predefined pointing elements that may be utilized by the user 16 for interacting with the display 6. A pointing element may include, for example, a fingertip 14 of a user 16 situated in the viewing space of the image sensor 8. In some embodiments, the pointing element may include, for example, one or more hands of the user 16, a part of a hand, one or more fingers, one or more parts of a finger, and one or more fingertips 14, or a hand-held stylus. Although FIG. 1 depicts the fingertip 14 as a pointing element, other pointing elements may be similarly used and may serve the same purpose. Thus, wherever the fingertip 14 is mentioned in the present description it should be considered as an example only and should be broadly interpreted to include other pointing elements as well.

Figure 17:
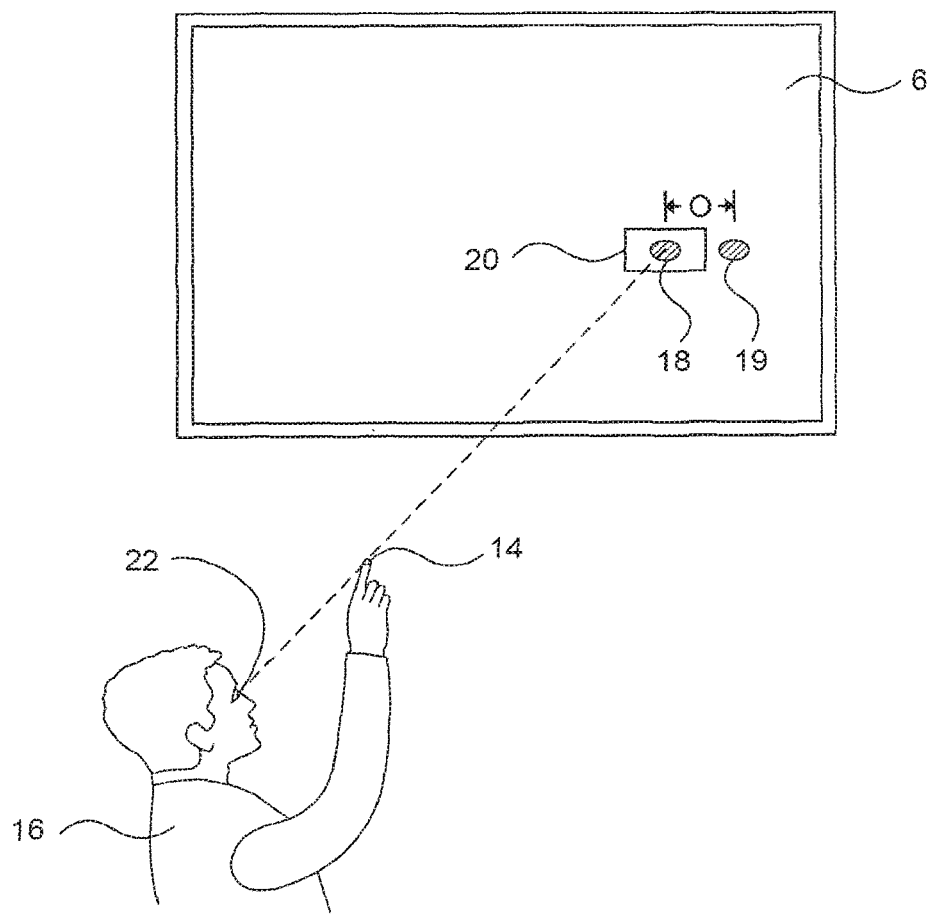
FIG. 17 illustrates an exemplary graphical representation of a touch-free user interface system in accordance with some of the disclosed embodiments.

The processing unit 12 may be configured to present display information, such as an icon 20 on the display 6 towards which the user 16 may point the fingertip 14. The processing unit 12 may be further configured to indicate an output 18 (indicator 18) on the display 6 corresponding to the location pointed at by the user 16. For example, as shown in FIG. 17, the user 16 may intend to point at the display information (icon 20) on the display 6. In this example, the processing unit 12 may determine that the user 16 is actually pointing at a gesturing location 19. However, the processing unit 12 may determine an offset O associated with the difference between the display information and the gesturing location 19. By using in part, information relating to the offset O, the processing unit 12 may send an output (e.g., indicator 18) to a destination of the display 6 reflective of the user's intent. In the example shown in FIG. 17, the indicator 18 is displayed at the same location as the icon 20, despite that the user 16 is actually pointing at the gesturing location 19.

A gesturing location 19 may be any mathematical representation associated with a location on the display 6, which is defined at some point by the system 2 as the location on which the user points at. The gesturing location 19 can include a specific coronation on the display (x, y) or (x, y, z, in case of a 3-D display). The gesturing location 19 can include an area or location on the display 6 (e.g., candidate plane). In addition, the gesturing location 19 can be a defined as probability function associated with a location on the display (such as a 3-D Gaussian function). The gesturing location 19 can be associated with a set of addition figures, which describes the quality of detection, such as probability indication of how accurate the estimation of the location on the display 6 of the gesturing location 19.

In case of a smart-glass, e.g., a wearable glass that include the capability to present to the user 16 digital information, the gesturing location may be defined as the location of a virtual plane, the plane on which the user perceived to see the digital information that is presented by the smart-glass display.

Display information may include static images, animated images, interactive objects (such as icons), videos, and/or any visual representation of information. Display information can be displayed by any method of display as described above and may include flat displays, curved displays, projectors, transparent displays, such as one used in wearable glasses, and/or displays that projects directly to or in directly to the user's eyes or pupils.

Indication or feedback of the pointed-at icon may be provided by, for example, one or more of a visual indication, an audio indication, a tactile indication, an ultrasonic indication, and a haptic indication. Displaying a visual indication may include, for example, displaying an icon on the display 6, changing an icon on the display 6, changing a color of an icon on the display 6, displaying an indication light, displaying highlighting, shadowing or other effect, moving an indicator on a display 6, providing a directional vibration indication, and/or providing an air tactile indication. The visual indicator may appear on top (or in front of) all other images or video appearing on the display 6. A visual indicator, such as icon on the display 6 selected by the user 16, may be collinear with the user's eye 22 and the fingertip 14 lying on a common viewing ray 24 (or line of sight). As used herein, and for reasons described later in greater detail, the term "user's eye" is a short-hand phrase defining a location or area on the user's face associated with a line of sight. Thus, as used herein, the term "user's eye" encompasses the pupil of either eye or other eye feature, a location of the user face between the eyes, or a location on the user's face associated with at least one of the user's eyes, or some other anatomical feature on the face that might be correlated to a sight line. This notion is sometimes also referred to as a "virtual eye".

An icon is an exemplary graphical element that may be displayed on the display 6 and selected by a user 16. In addition to icons, graphical elements may also include, for example, objects displayed within a displayed image and/or movie, text displayed on the display 6 or within a displayed file, and objects displayed within an interactive game. Throughout this description, the terms "icon" and "graphical element" are used broadly to include any displayed information.

Figure 3A:
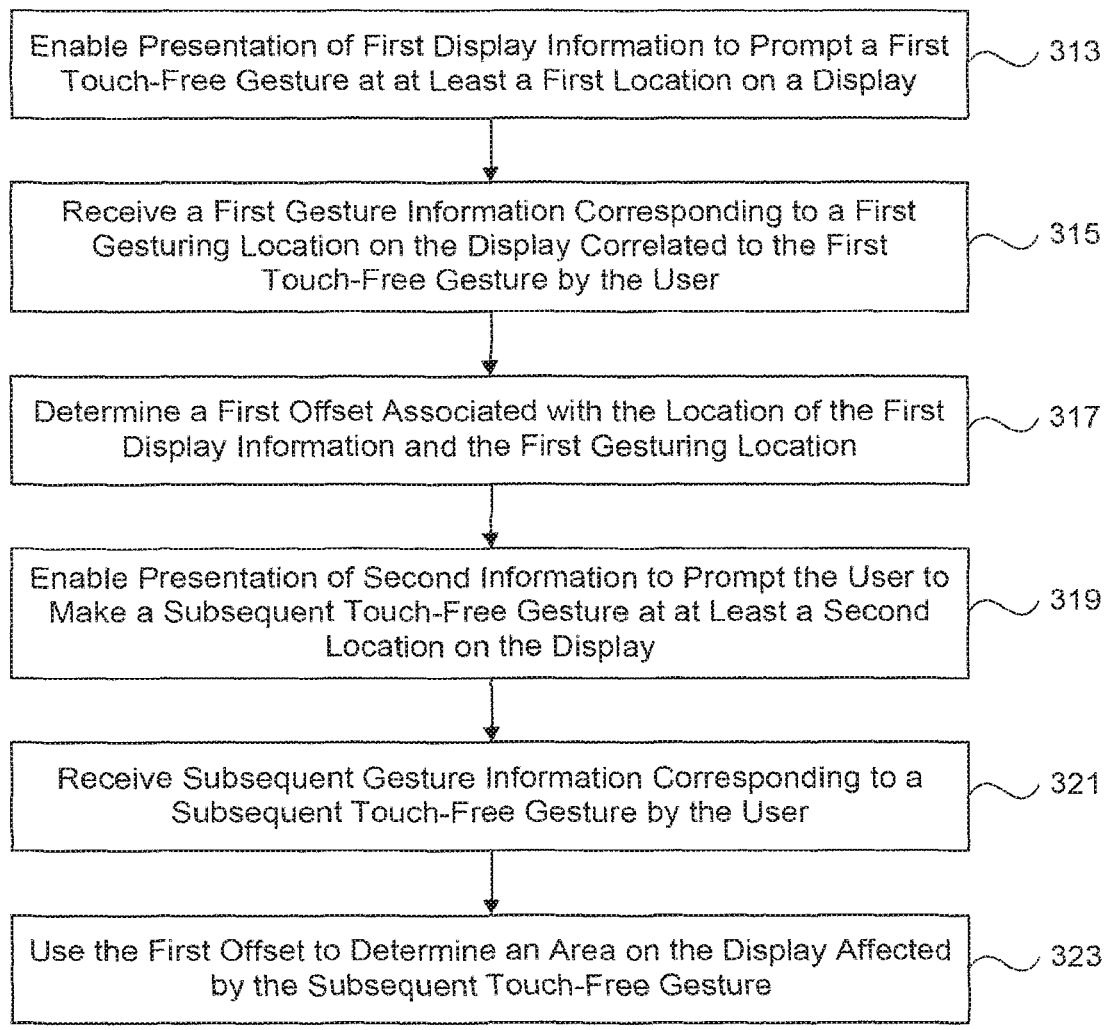
FIG. 3A illustrates exemplary offset determination steps that may be used in accordance with methods, systems, and computer readable media associated with embodiments of the invention.

As depicted in step 313 of FIG. 3A, embodiments of the invention may enable presentation of first display of information to a user 16 to prompt a first touch-free gesture at at least a first location on a display 6. Enabling presentation may occur, for example, by transmitting data from a processor 15 to a display device, in order to cause the information or a representation thereof to be presented to the user 16 via the display 6. The representation may be designed to evoke or prompt the user 16 to make a touch-free gesture toward the display 6, as illustrated, by way of example only, in FIG. 1. In particular, FIG. 1 depicts a user 16 performing a finger pointing touch-free gesture. The first location on the display 6 may generally correspond to the location of display information. The correspondence may not be precise as there may be differences between the user's perception (i.e., the displayed information) and the actual location of the displayed information (i.e., the gesturing location), as described later in greater detail. The first information may include, for example, graphical elements, icons, or other information, as described in more detail below.

For example, the processing unit 12 may also be configured to display on the display 6 one or more selectable graphical elements or icons. FIG. 1 illustrates four exemplary icons 20a, 20b, 20c, and 20d. However, in some embodiments, any number of icons may be displayed on the display 6 at any time. Any one of the icons 20a-20d may be selected by the user 16 by pointing the fingertip 14 at a particular icon the user 16 intends to select.

As depicted in step 315 of FIG. 3A, embodiments of the invention may receive first gesture information corresponding to a first gesturing location on the display 6 correlated to and reflective of a first touch-free gesture by a user 16. First gesture information can correspond to any motion or pose, as described later in greater detail. The gesture information may include, for example, numerical or graphical data corresponding to a detected hand-gesture or pointing element. The numerical or graphical data may be received by at least one processor 15, and the processor 15 may correlate it to a known display location.

The processing unit 12 may be configured to identify a selection of an icon by the user 16 based on a predefined criterion. For example, when the user 16 points at the icon for a predefined period of time (i.e., a predefined number of seconds), the processing unit 12 may select the icon. In addition, the processing unit 12 may be configured to identify a selection of an icon by the user 16 when the user 16 performs a predefined motion towards the selected icon. For example, the predefined motion may include a tapping motion, wherein a movement of the fingertip 14 towards the selected icon is followed by a movement of the fingertip 14 away from the selected icon. The system 2 may be configured to generate a visual and/or audio feedback when the user 16 points to and selects an icon. If, for example, a single icon is located on a display 6 and a user gesture is detected, the system 2 may be configured to assume that the user 16 has gestured toward the only displayed icon. If multiple icons are displayed, the system 2 may be configured to assume that the user 16 has gestured toward the icon closest to the gesturing location 19 associated with the user's gesture.

Because, as described later in greater detail, users 16 may have one eye that is more dominant than the other, an actual gesturing location (detected pointing location) on a display 6 may differ from the actual displayed location of an icon to which the user 16 believes he/she is pointing. Thus, in order to increase the accuracy of a touch-free gesture system, the system may be enabled to determine an offset O associated with the location of the first display information (e.g., icon 20) and the first gesturing location 19, as is generally depicted in FIG. 17, step 317 of FIG. 3A, and as is described later in greater detail. The offset O may be determined and applied in a number of different ways. For example, the offset O may be accomplished through the selection of a "virtual eye" at a location offset from the center point between the user's two eyes, and the virtual eye may be used as a starting point of the line of sight. Alternatively, the offset O may be determined based on detected differences on a display between an icon (e.g., icon 20) at which a user 16 is gesturing and the detected location of gesturing, i.e., gesturing location 19. An example and greater detail are provided later with respect to FIGS. 12, 13, and 17.

While this description at times refers to the determination of a single offset O, it is to be understood that this is a short hand and that the system may be enabled to determine multiple offsets (sequentially or at periodic intervals) in order to potentially achieve a higher level of accuracy, as well as multiple offsets associated with different locations on the display 6, associated with different sizes of icons, associated with different clustering of icons, or associated with the distance between the icons in the area or location on the display where the gesture location is detected. Furthermore, an offset may exist in any direction represented by up to one-coordinate, two-coordinates, or in the case of a 3-D offset, three-coordinates. Further, an Offset O may be any mathematical representation associate with the difference of the location on the display on which the user perceives as pointing at, and the gesturing location 19 as directed by the system 2. The offset O can relate to the distance between these two locations on the display 6 itself (e.g., 24 pixels to the right, and 8 pixels to the top), a vector indicating the difference between the two locations (2-D or 3-D vector), a set of figures relating to the distance between these two locations, and/or a formula that describes the distance between these two locations. The offset O can relate to the "virtual eye" location as compared to other anatomical locations on the user's face (such as the user's eye 22). The offset O can relates to the location of the user's pointing element (e.g., fingertip 14), and may be used to correct the detected location of the pointing element. The offset O can also relate to any feature of the calculated viewing ray 24 starting front the "virtual eye," through the pointing element, and intersecting with the display 6.

When second information is thereafter displayed, as is depicted in step 319 of FIG. 3A, and the user 16 gestures at the second information, graphical or numerical data associated with that second gesture may be received via an image sensor (e.g., image sensor 8 in FIG. 1), as depicted by step 321 of FIG. 3A, and transferred to a processor (e.g., processor 15 in FIG. 2A). Due to the fact that the user has one eye that is dominant over the other, the second or subsequent gesture location may not accurately align with the second information, i.e., the location at which the user intended to point. Using the previously determined first offset (or plurality of offsets) from step 317, however, the processor 15 may be configured to correct for the misalignment, as is depicted in step 323. As the result of the correction, the user's intent may be determined, and a corresponding action may be initiated. One such action may include sending an output to display 6 to provide a displayed representation of the user's intent. (e.g., although the system may have detected the user pointing 3 inches to the left of an icon, the offset correction might enable a cursor to be displayed closer to or on the icon.) Exemplary operation of the offset is described in greater detail in connection FIGS. 12 and 13.

In some embodiments, the fingertip 14 does not contact the display 6 while pointing or during the tapping motion. In an example illustrated in FIG. 1, the fingertip 14 is pointing towards the icon 20b. The processing unit 12 may detect the user 16 pointing the fingertip 14 towards the icon 20b for a predefined amount of time or detect the user 16 performing a tapping motion (or clicking motion) towards the icon 20b by analyzing images of an image stream (e.g., video stream) obtained by the image sensor 8. When the processing unit 12 determines that a particular icon has been selected, a corresponding command and/or message associated with the selected icon may be executed or generated, respectively. The generation of a message or the execution of a command may address corresponding results to any one or more of an operating system, one or more local services, one or more applications, one or more devices, one or more remote applications, one or more remote services, or one or more remote devices.

In some embodiments, the device 4 may communicate with an external device or website in response to a selection of a graphical element with a communication. The communication may include sending a message to one or more of an application running on the external device or website, a service running on the external device or website, an operating system running on the external device or website, a process running on the external device or website, one or more applications running on a processor of the external device or website, a software program running in the background of the external device or website, or one or more services running on the external device or website. Further, the communication may include sending a message to an application running on the device 4, a service running on the device 4, an operating system running on the device 4, a process running on the device 4, one or more applications running on a processor 15 of the device 4, a software program running in the background of the device 4, or one or more services running on the device 4. The communication with the external device or website may occur over a communication network.

In response to a selection of a graphical element, a message may be sent to the external device or website requesting data relating to a graphical element identified in an image from an application running on the external device or website, a service running on the external device or website, an operating system running on the external device or website, a process running on the external device or website, one or more applications running on a processor of the external device or website, a software program running in the background of the external device or website, or to one or more services running on the external device or website. A message may also be sent to the device 4 requesting data relating to a graphical element identified in an image from an application running on the device 4, a service running on the device 4, an operating system running on the device 4, a process running on the device 4, one or more applications running on a processor 15 of the device 4, a software program running in the background of the device 4, or to one or more services running on the device 4.

The message sent to the external device or website may include a command. This command may include, for example, a command to run an application on the external device or website, a command to stop an application running on the external device or website, a command to activate a service running on the external device or website, a command to stop a service running on the external device or website, or a command to send data relating to a graphical element identified in an image. The message to the device 4 may include a command. This command may include, for example, a command to run an application on the device 4, a command to stop an application running on the device 4, a command to activate a service running on the device 4, a command to stop a service running on the device 4, or a command to send data relating to a graphical element identified in an image.

In response to a selection of a graphical element, the device 4 may receive data from the external device or website relating to a graphical element identified in an image, and the device 4 may present the received data to the user 16.

The commands executed and/or the messages generated by pointing with two pointing elements, such as two hands, can include, for example, selecting an area, zooming in or out of the selected area by moving the fingertips away from or towards each other, and rotating the selected area by rotating the fingertips. The command executed and/or the message generated by pointing with two fingers can also include creating an interaction between two objects, such as combining a music track with a video track. In addition, a user 16 may execute a command and/or generate a message to create a gaming interaction by pointing one finger at the display 6 and pointing and moving another finger towards another location on the display 6. In addition, a user 16 may execute a command and/or generate a message to slide an icon across the screen (this action may be used for unlocking the device), scroll a page or a folder, and increase or decrease the volume. A command may be a "swiping command" over one or more icons.

The commands may be executed and/or messages may be generated in response to a predefined gesture performed by the user 16 after identification of a location on the display 6 at which the user 16 had been pointing. The system 2 may be configured to detect a gesture and execute an associated command and/or generate an associated message. The detected gestures may include, for example, one or more of a swiping motion, a pinching motion of two fingers, pointing, a left to right gesture, a right to left gesture, an upwards gesture, a downwards gesture, a pushing gesture, opening a clenched fist, opening a clenched fist and moving towards the image sensor 8, a tapping gesture, a waving gesture, a circular gesture performed by finger or hand, a clockwise and/or a counter clockwise gesture, a clapping gesture, a reverse clapping gesture, closing a hand into a fist, a pinching gesture, a reverse pinching gesture, splaying the fingers of a hand, closing together the fingers of a hand, pointing at a graphical element, holding an activating object for a predefined amount of time, clicking on a graphical element, double clicking on a graphical element, clicking on the right side of a graphical element, clicking on the left side of a graphical element, clicking on the bottom of a graphical element, clicking on the top of a graphical element, grasping an object, gesturing towards a graphical element from the right, gesturing towards a graphical element from the left, passing through a graphical element from the left, pushing an object, clapping, waving over a graphical element, a blast gesture, a clockwise or counter clockwise gesture over a graphical element, grasping a graphical element with two fingers, a click-drag-release motion, sliding an icon, and/or any other motion or pose that is detectable by a sensor.

Figure 2B:
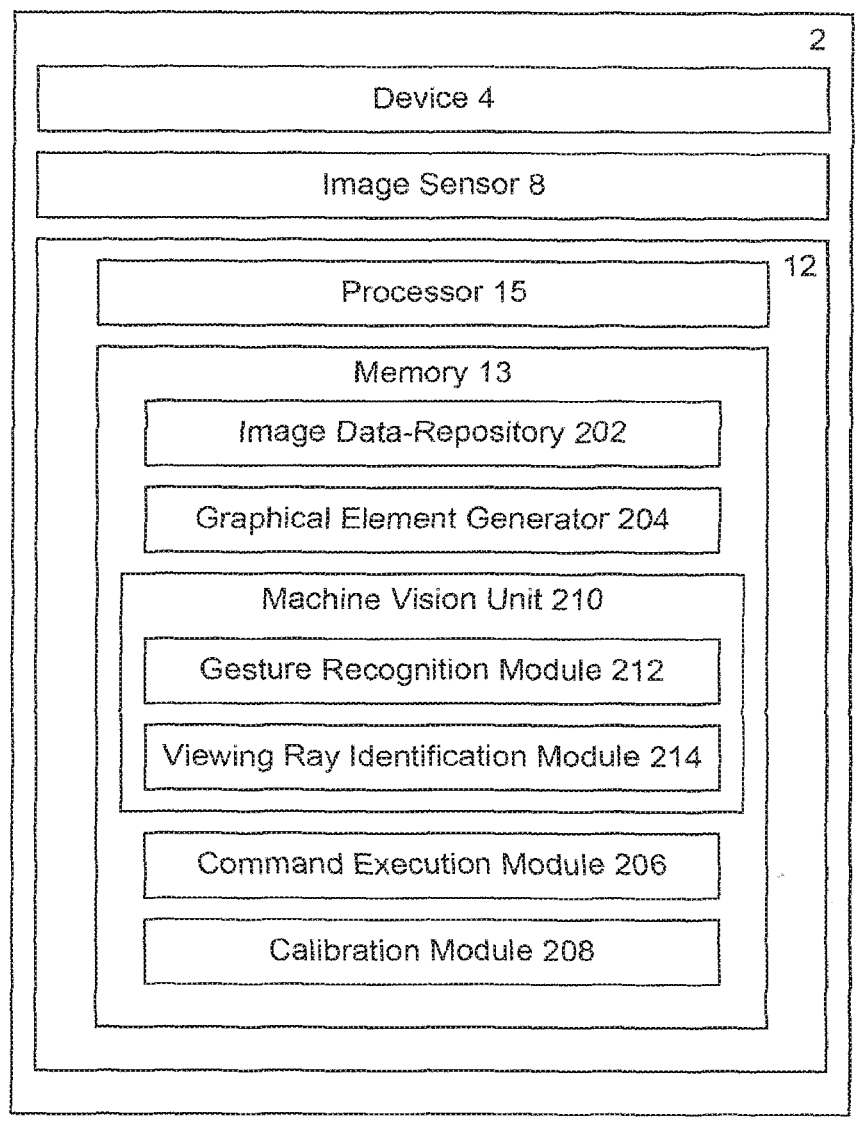
FIG. 2B illustrates an exemplary block diagram of a system in accordance with some of the disclosed embodiments.

FIG. 2B depicts an exemplary schematic representation of the system 2. In particular, the processing unit 12 may comprise, for example, an images data-repository 202 configured for storing images captured by the image sensor 8; a graphical element generator (i.e., icon generator) 204 configured to generate and display icons on the display 6; a command execution module 206 configured to enable execution of a command associated with a respective icon displayed on the display 6; a calibration module 208 configured for performing a calibration process; and a machine vision unit 210. The machine vision unit 210 may comprise, for example, a gesture recognition module 212 configured to identify gestures made by the user 16 from the captured images; and a viewing ray identification module 214 configured to identify a point or an location on the display 6 towards which a user 16 is pointing.

Figure 3B:
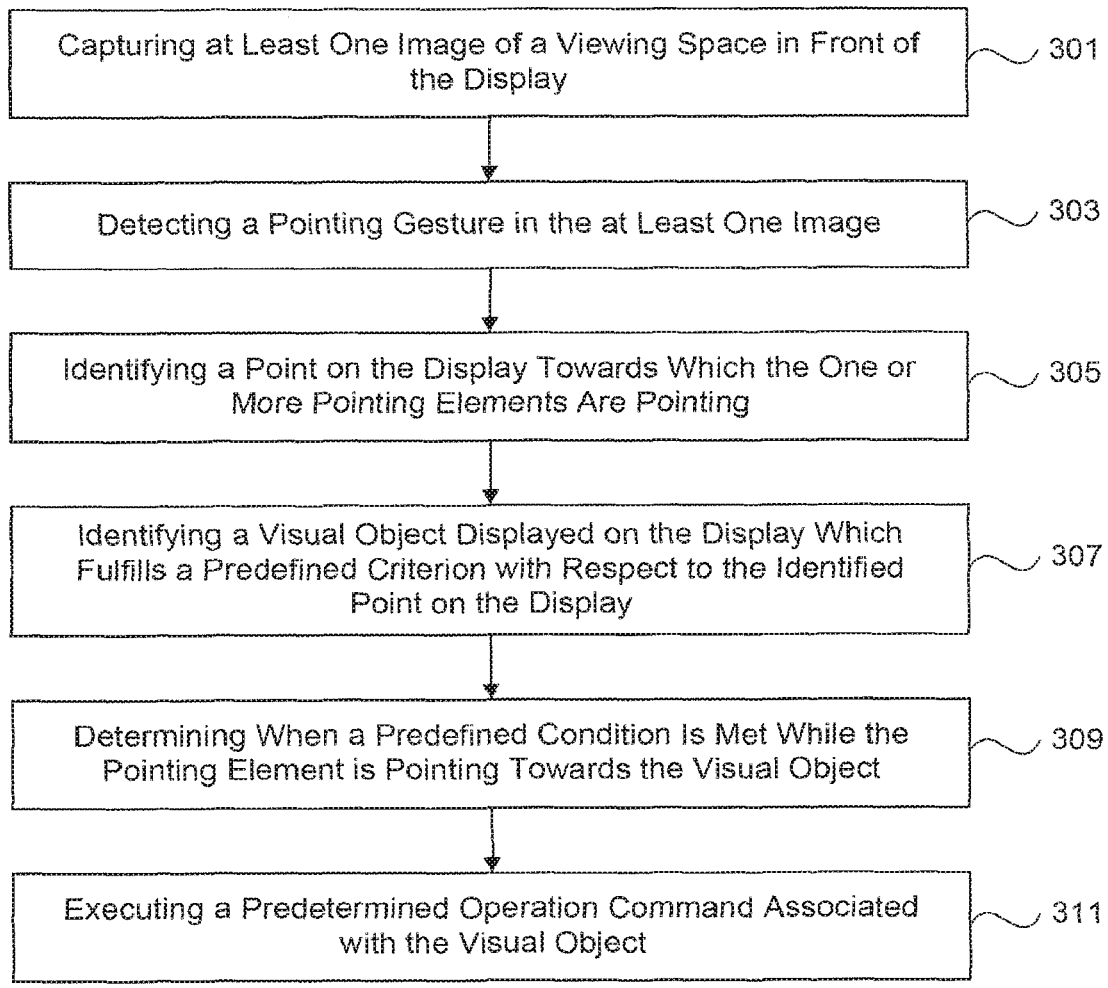
FIG. 3B illustrates exemplary gesture detection and identifying steps that may be used in accordance with methods, systems, and computer readable media associated with embodiments of the invention.

FIG. 3B depicts a flowchart showing an exemplary method that may be performed by the system 2. The method may include a step 301, capturing at least one image of a viewing space in front of the display 6. For example, the image sensor 8 may capture a succession of images of the viewing space in front of the display 6. The images may be captured and stored in a data-repository, such as the image data-repository 202. The captured images may be processed at a later occasion or they may be immediately processed as they are being captured. The captured images may include, for example, a user 16 positioned in front of the display 6 and attempting to interact with one or more graphical element displayed on the display 6 (i.e., a user 16 attempting to point a pointing element, such as the fingertip 14, towards an icon or text displayed on the display 6).

The captured images may also include one or more predefined parts of the face of the user 16, such as one or more of the user's eyes 22, and one or more pointing elements, such as the fingertip 14. The method may include a step 303, detecting a pointing gesture in the at least one image. In particular, identification of the user 16 and the pointing elements may be accomplished, for example, with the help of the machine vision unit 210, including the gesture recognition module 212.

The method may include a step 305, identifying a point or location on the display 6 towards which the one or more pointing elements are pointing. This point may be identified, for example, with the help of the viewing ray identification module 214. Since the user's eye 22, the fingertip 14, and the point on the display 6 that a selected icon is located may be collinear and lie on a common viewing ray 24, the processing unit 12 may be configured to identify the viewing ray 24. The step 305 may further include one or more processes designated for enhancing the identification of the point on the display 6 towards which the user 16 is pointing. Although FIG. 1 depicts the user's eye 22 as a part of the face of the user 16 that may be used for identifying a viewing ray 24, other parts of the face may similarly be identified and used for that purpose. Thus, wherever one or more of the user's eyes 22 are mentioned in the present description it should be considered as an example only and should be broadly interpreted to include other parts of the face as well.

The method may include a step 307, identifying a visual object displayed on the display 6 which fulfils a predefined criterion with respect to the identified point on the display 6.

For example, the visual object (or graphical element) may be the closest visual object to the identified point on the display 6 that is selected by the user 16.

The method may include a step 309, determining when a predefined condition is met while the pointing element is pointing towards the visual object. Step 309 may be performed after a selected visual object (graphical element) has been determined. As mentioned above, the condition may include, for example, a predefined period of time during which the pointing element is pointing towards the determined point and/or a predefined gesture (e.g., a tapping motion towards the display 6), or any other suitable condition.

The method may include a step 311, executing a predetermined operation command associated with the visual object. Step 311 may be performed after the predefined condition has been met. For example, the command execution module 206 may be configured to execute a command, such as interacting with other functional elements in device 4 that are associated with the selected graphical element.

In order to determine which graphical element is selected by an interacting user 16, it is desirable to first identify a point on the display 6 towards which the user 16 is pointing.

In some embodiments, the image sensor 8 may include a 3-D image sensor or a pair of 2-D stereoscopic image sensors. In these embodiments, the processing unit 12 may be configured to locate x-, y-, and z-coordinates of the user's eye 22 and/or the fingertip 14 in the 3-D viewing space. The processing unit 12 may then determine a viewing ray 24 having a vertex at the eye 22 and passing through the fingertip 14. As illustrated in FIG. 1, a dot or marker 18 may be positioned on the display 6 at a location where the viewing ray 24 intersects the display 6. In some embodiments, the system 2 may comprise a combination of 2-D and 3-D image sensors and may be configured to obtain x- and y-coordinates of the user's eye 22 and the fingertip 14 from images captured by the 2-D image sensor and obtain the z coordinate of the user's eye 22 and the fingertip 14 from images captured by the 3-D image sensor. In some embodiments, the 3-D image sensor may be configured to obtain low-resolution images. The combined information from the 2-D and 3-D image sensor may be used for determining a 3-D viewing ray 24.

In other embodiments, the image sensor 8 may include a 2-D position sensor. A user 16 standing in front of the display 6 may point anywhere on the display 6 and the specific viewing ray 24 associated with the user's pointing may be determined based on the 2-D position (i.e., the x- and y-coordinates) of the user's eye 22 (or other anatomical location) and the 2-D position of the pointing element (i.e., the fingertip 14) as captured by the image sensor 8 along with the distance between the anatomical location and the display 6 and the distance between the pointing element and the display 6 or the user 16 or user's eye 22.

In some embodiments, the processing unit 12 may be configured to determine a point on the display 6 towards which the user 16 is pointing. For example, the x- and y-coordinates of the user's eye 22 may be determined form the images captured by the image sensor 8. As illustrated in FIG. 6, for example, the distance R1 between the user 16 and the display 6 can be estimated. Based on the estimated distance R1, the z-coordinate of the user's eye(s) 22 in the viewing space can be obtained.

The distance R1 can be determined, for example, based on the distance between the user's eyes 22 as identified in an image obtained by the image sensor 8. A similar distance exists between the eyes (e.g. pupils) of different individuals. The degree of similarity is higher for individuals belonging to the same ethnic group. Therefore, the distance between the eyes of a user 16 may be indicative of the distance R1 between the user's eye 22 and the display 6.

The x- and y-coordinates of the pointing element can be determined from images captured by the image sensor 8. Using the estimated distance R1 between the pointing element and the user 16, the z-coordinate of the pointing element in the viewing space can be obtained.

Once the x-, y-, and z-coordinates of the user's eye 22 (or virtual eye or other anatomical feature) and the x-, y-, and z-coordinates of the pointing element have been obtained, a straight line (viewing ray 24) extending through these two points may be determined and the point where this line intersects the display 6 may be identified. The identified point of intersection of this line with the display 6 may be determined as the point on the display 6 towards which the user 16 is pointing, e.g., Gesture Location.

In some embodiments, the display 6 may be a 3-D display and the displayed graphical elements may be 3-D graphical elements that are perceived to the user 16 as being located in the viewing space located in front of the display 6 or behind the device 4. Thus, determining the location of the point towards which the user 16 is pointing can be executed with a 3-D display, wherein the identified viewing ray 24 extends from the user's eye 22 through the pointing element and to a visual element representing a respective graphical element that is perceived to the user 16 as being in the space in front of the display 6.

In some embodiments, the display 6 is a 2-D display and the displayed graphical elements may be 2-D graphical elements. Thus, determining the location of the point towards which the user 16 is pointing can be executed with a 2-D display 6, wherein the identified viewing ray 24 extends from the user's eye 22 through the pointing element and to the intersection of the viewing ray 24 with the display 6.

Figure 4:
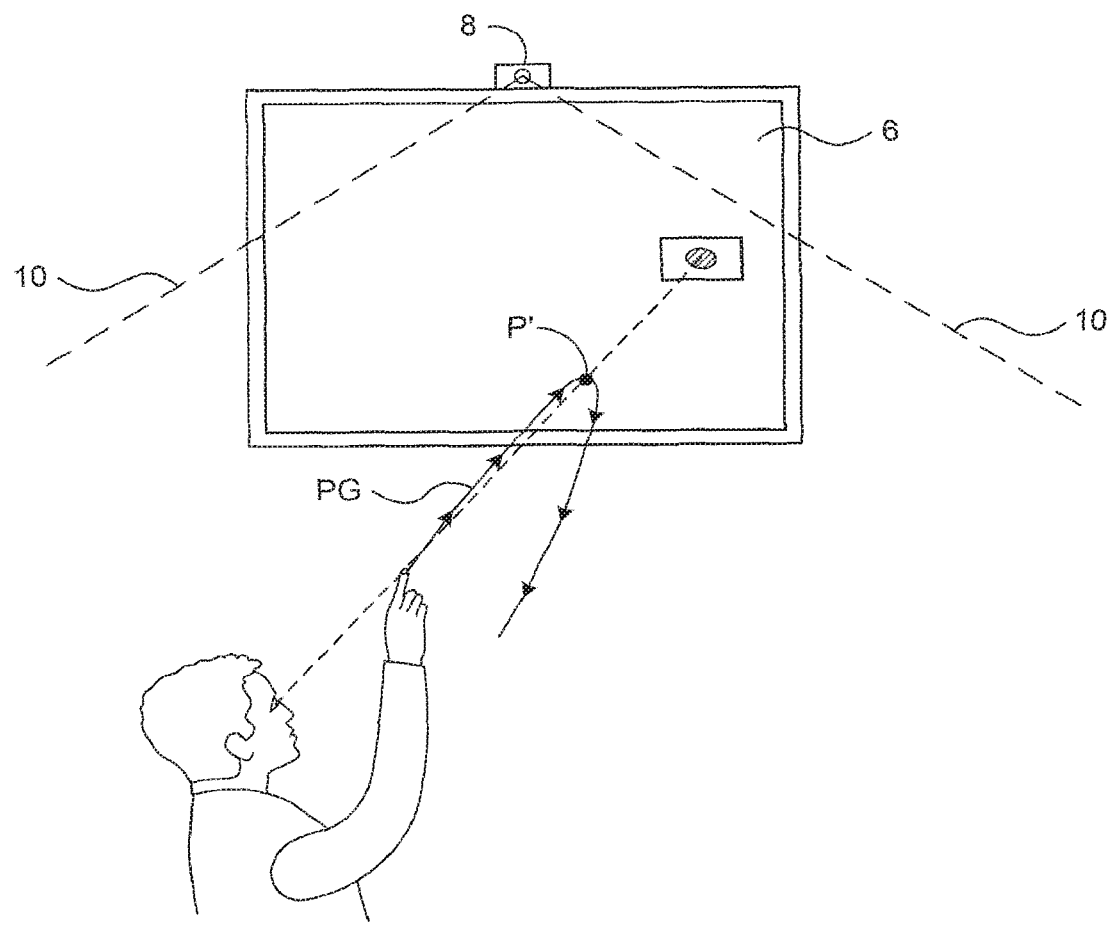
FIG. 4 illustrates an exemplary graphical representation of a touch-free user interface system in accordance with some of the disclosed embodiments.

FIG. 4 depicts an exemplary graphical representation of a user 16 pointing towards the display 6. To better determine the point on the display 6 towards which a user 16 is pointing, it may be advantageous to identify the location of the pointing element in the viewing space while pointing. Therefore, it may be advantageous to identify a point P', which is the location of the pointing element during a pointing gesture that the pointing element is closest to the display 6. The hand motion of the user 16 during the pointing gestures is illustrated as a motion vector characterized by the point P' located closest to the display 6.

The system 2 may be configured to identify the point P' during a pointing gesture. In some embodiments, wherein the image sensor 8 includes a 3-D image sensor or a stereoscopic image sensor, the processing unit 12 may be configured to extract the point P' from a captured image, such that the z-coordinate of point P' may indicate the position of the pointing element when the pointing element is located closest to the display 6.

In some embodiments, wherein the image sensor 8 includes a 2-D image sensor, the point P' may be identified based on an analysis of one or more features of the pointing element during the pointing gesture, which may include, for example, the motion path of the pointing element, the motion vectors of the pointing element, the change in motion vectors of the pointing element, the pose of the pointing element, the size of the pointing element, the acceleration and/or deceleration of the pointing element. In some embodiments, identification of point P' can be based on a change in the position of the pointing element in the viewing plane. For example, after the user 16 extends his arm and the point P' has been reached, the user 16 may retract his arm. Changes in the position (i.e., coordinates) of the pointing element in the viewing space, may indicate that the arm has been retracted and may be used to identify point P'.

In some embodiments, the point P' can be identified based on changes in the size of the pointing element during the pointing gesture. For example, as the user 16 extends his arm towards the display 6, the size of the pointing element may increase (e.g., the size of the fingertip 14 in the captured images may increase). The processing unit 12 may be configured to track the size of the pointing element and determine the location of the pointing element, at which the size of the pointing element is the largest.

Figure 5:
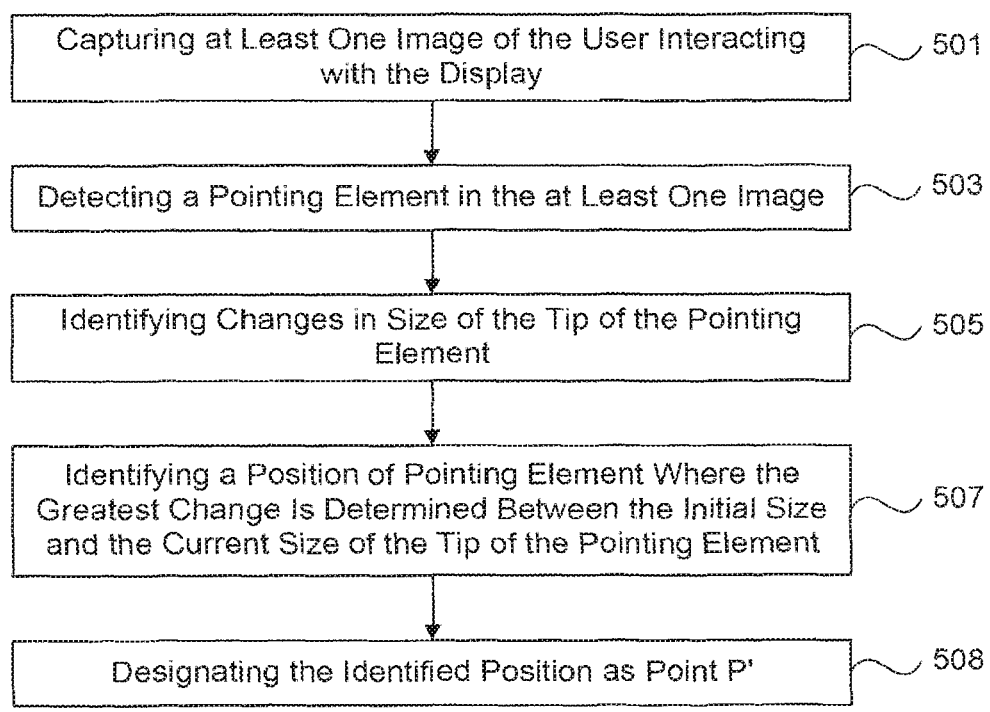
FIG. 5 illustrates exemplary steps for identifying a pointing location that may be used in accordance with methods, systems, and computer readable media associated with embodiments of the invention.

FIG. 5 depicts a flowchart illustrating an exemplary method for identifying point P'. Operations described with reference to FIG. 5 can be executed, for example, by the processing unit 12 including the machine vision module 210.

The method may include a step 501, capturing at least one image of the user 16 interacting with the display 6. In particular, the image sensor 8 may capture images of the user 16 while attempting to interact with icons displayed on the display 6. The method may include a step 503, detecting a pointing element in the at least one image. The method may include a step 505, identifying changes in size of the tip of the pointing element. During step 505, the captured images may be processed and changes in the size of the pointing element in different images may be identified. For example, the ratios between the size of the fingertip 14 at an initial position, at the start of the pointing gesture, with respect to the size of the fingertip 14 along different positions along the motion of the arm towards the display 6 may be calculated and a percentage of growth in size of the fingertip 14 can be identified. The largest size of the pointing may occur once the pointing element is positioned at the shortest distance from the display 6, and the greatest change in its size with respect to its initial position may be recorded. When the arm is then retracted, the change in size may decrease as the size of the pointing element becomes smaller.

The method may include a step 507, identifying a position of the pointing element where the greatest change is determined between the initial size and the current size of the tip of the pointing element. The method may include a step 508, designating the identified position as point P'.

Figure 6A:
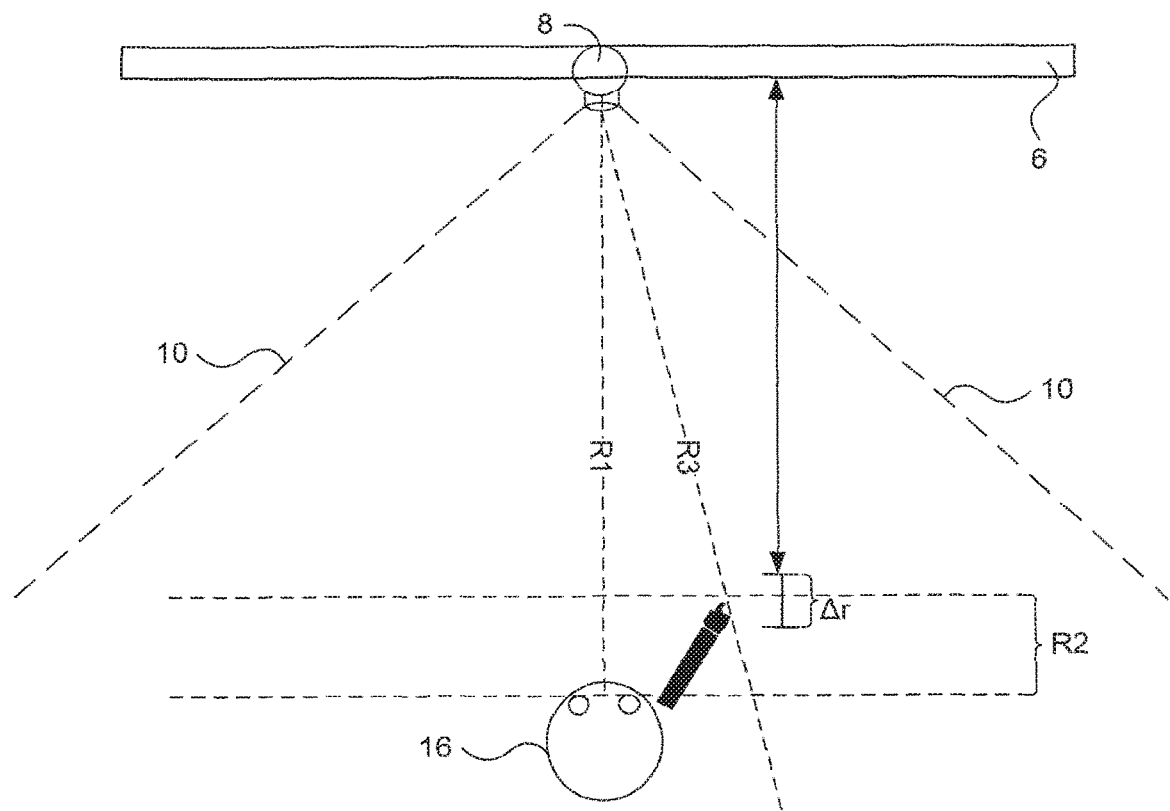
FIG. 6A illustrates an exemplary graphical representation of a touch-free user interface system in accordance with some of the disclosed embodiments.

FIG. 6A is a top view illustration depicting a user 16 pointing towards a display 6. As shown in FIG. 6A, the image sensor 8 may be positioned adjacent to the display 6, and may be capable of capturing images of a 3-D viewing space indicated by the broken lines 10. The distance R1 of the user 18 from the display 6 is indicated by line R1, which extends from the display 6 to a point on an imaginary line between the eyes (e.g., between the pupils) of user 16. As mentioned above, the distance R1 can be determined, for example, based on the distance between the user's eyes as identified in an image obtained by the image sensor.

Furthermore, based on typical human behavior it can be assumed that when a user 16 is pointing towards the display 6 his arm may not necessarily be fully extended from his body, and it can be assumed that the arm is not necessarily fully retracted when it returns to the body. The extension length of the pointing element from the body of the user 16 towards the display 6 is indicated in FIGS. 6A and 6B by a range R2.

The range R2 can be estimated, for example, based on the user's height and the estimated proportions of his body. In addition, the range R2 may be estimated based on information indicating the distance R1 of the user 16 from the display 6. Additionally, information with respect to the age and gender of the user 16 may also be used during the estimation of the range R2. In addition, the range R2 may be estimated from recoded statistical information obtained from a plurality of users 16 that indicates the extension of the arm of the users 16 while pointing (which may also take into consideration the height and proportions of each user 16). Further, this information can be classified based on geographical and/or ethnic origin of the users 16, in order to differentiate between different pointing gestures that may be associated with different geographical and/or ethnic origins. Thus, for example, an average length for range R2 can be calculated from the recorded information with respect to the arm extension lengths of many users 16.

While the range R2 may enable estimation of the distance of the pointing element from the user's body, some deviation may exist between the extensions of the arm in the pointing gestures made by different users 16. FIG. 6A also illustrates deviation Δr, which represents a potential deviation in the extension of the arm between different pointing gestures. Assuming, as mentioned above, that range R2 is an average value of the measured extension of the arm in pointing gestures of different users 16, deviation Δr can be determined, for example, as a value which equals one or more standard deviations of that average value described above (e.g., after normalization of the height factor).

Figure 6B:
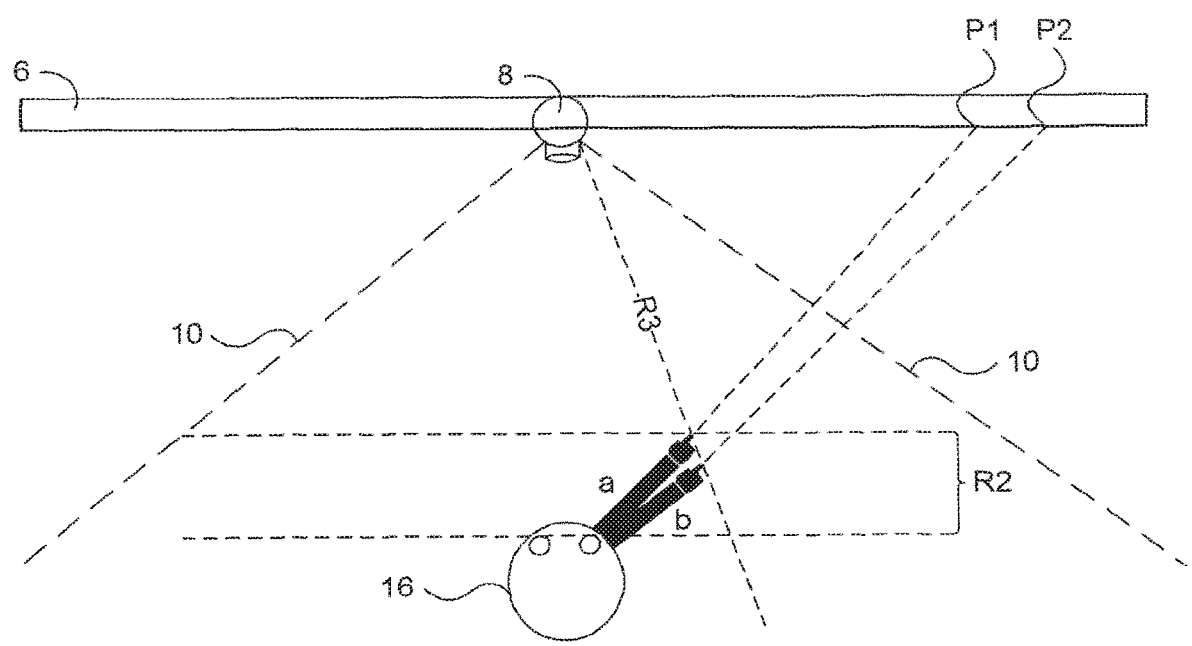
FIG. 6B illustrates an exemplary graphical representation of a touch-free user interface system in accordance with some of the disclosed embodiments.

FIG. 6B is a top view illustration depicting different exemplary extensions of a pointing element. As shown in FIG. 6B, an image sensor 8 may be positioned adjacent to display 6 and may be capable of capturing images of a 3-D viewing space. Images of the user 16 may be captured by the image sensor 8. Unlike images captured by a 3-D image sensor, images that are captured by a 2-D image sensor may provide an image projection of the user 16 onto the display 6 without depth perception. As show in FIG. 6B, the user 16 may extend his arm and point towards the display 6. Two extensions having different lengths are shown. A viewing ray extending from extension a (the longer extension) intersects the display 6 at a point P1, and a viewing ray extending from extension b (the shorter extension) intersects the display 6 at point P2.

Although, extensions a and b may be pointing to different locations on the display 6, both extensions may be viewed by the image sensor 8 in the same manner, i.e., converging on a same line R3.

As mentioned above, in order to identify the gesturing location 19, (the location on the display 6 towards which a user 16 is pointing), a viewing ray 24 connecting the eyes of the user 16, the pointing element, and a respective point of intersection of the viewing ray 24 with the display 6 may be determined. However, as a result of various uncertainties that may exist during the identification of the viewing ray 24, uncertainly may also exist as to where exactly on the display 6 the user 16 is pointing. These uncertainties may include, for example, uncertainty with regard to the identification of the tip of the pointing object, and with regard to the identification of a point located between the eyes of the user 16, which may best represent the viewing ray 24. Furthermore, as discussed above, 2-D image sensors may include additional uncertainty with respect to the actual extension of the pointing element from the body of the user 16 and with respect to the distance of the user 16 from the display 6.

As a result of these potential uncertainties, when a user 16 is pointing towards the display 6, instead of identifying a single point on the display 6 towards which the user 16 may be pointing, a larger area (or candidate plane) may be identified on the display 6. The candidate plane may represent area, in which a plurality of possible lines extending from the user's eye 22 pass through the pointing element and intersect the display 6. An image obtained by image sensor 8 may include the user's eye 22 and the fingertip 14, and may include a projection of the viewing ray 24 onto projection plane (the projection plane being the plane captured by the image sensor 8). The set of all lines in the viewing space whose projection onto the projection plane is the same as the projection of the viewing ray 24 onto the projection plane forms the candidate plane. Each line extending from the user's eye 22 through a pointing element and a common candidate plane is a candidate viewing ray. A candidate plane can be characterized by different features including, for example, the number of pixels in a candidate plane (a candidate plane can comprise one or more pixels), its size (e.g., in pixels or its measured diameter), its shape, its location on the screen, etc.

Accordingly, it would be advantageous to more accurately identify a point or location on the display 6 towards which a user 16 is pointing, notwithstanding the uncertainties mentioned above. Operations described with reference to the following figures are applicable in system equipped with any one of 2-D, 3-D, and stereoscopic image sensors.

In some embodiments, the user 16 may perform a calibration procedure. In the calibration procedure, the user 16 may be instructed to point sequentially at one or more graphical elements (e.g., icons) displayed on the display 6. One of the graphical elements may include, for example, a graphical element, such that a selection thereof may switch the device 4 from a standby mode to an active mode or the selection may unlock the display 6. When a user 16 points towards such a graphical element, the processing unit 12 may determine the position of the pointing object and the user's eye 22 in an image obtained by the image sensor 8 while the user 16 is pointing at the graphical element. The fingertip 14 may be identified in an image obtained by the image sensor 8, for example, as disclosed in Applicant's co-pending U.S. patent application Ser. No. 10/593,628, which published as U.S. patent publication no. 2008/0042981, and which is hereby incorporated by reference in its entirety.

Methods for identifying a face and eyes in an image are known in the art. When the user 16 subsequently points to an icon on the display 16, the processing unit 12 may determine the location on the display 6, and hence the icon, to which the user 16 is pointing using calibration data, together with limitations on the distance between the user's eye 22 and the fingertip 14 and the distance between the user 16 and the display 6, which may be determined from the distance between the user's eyes in the image obtained by the image sensor 8.

Figure 7:
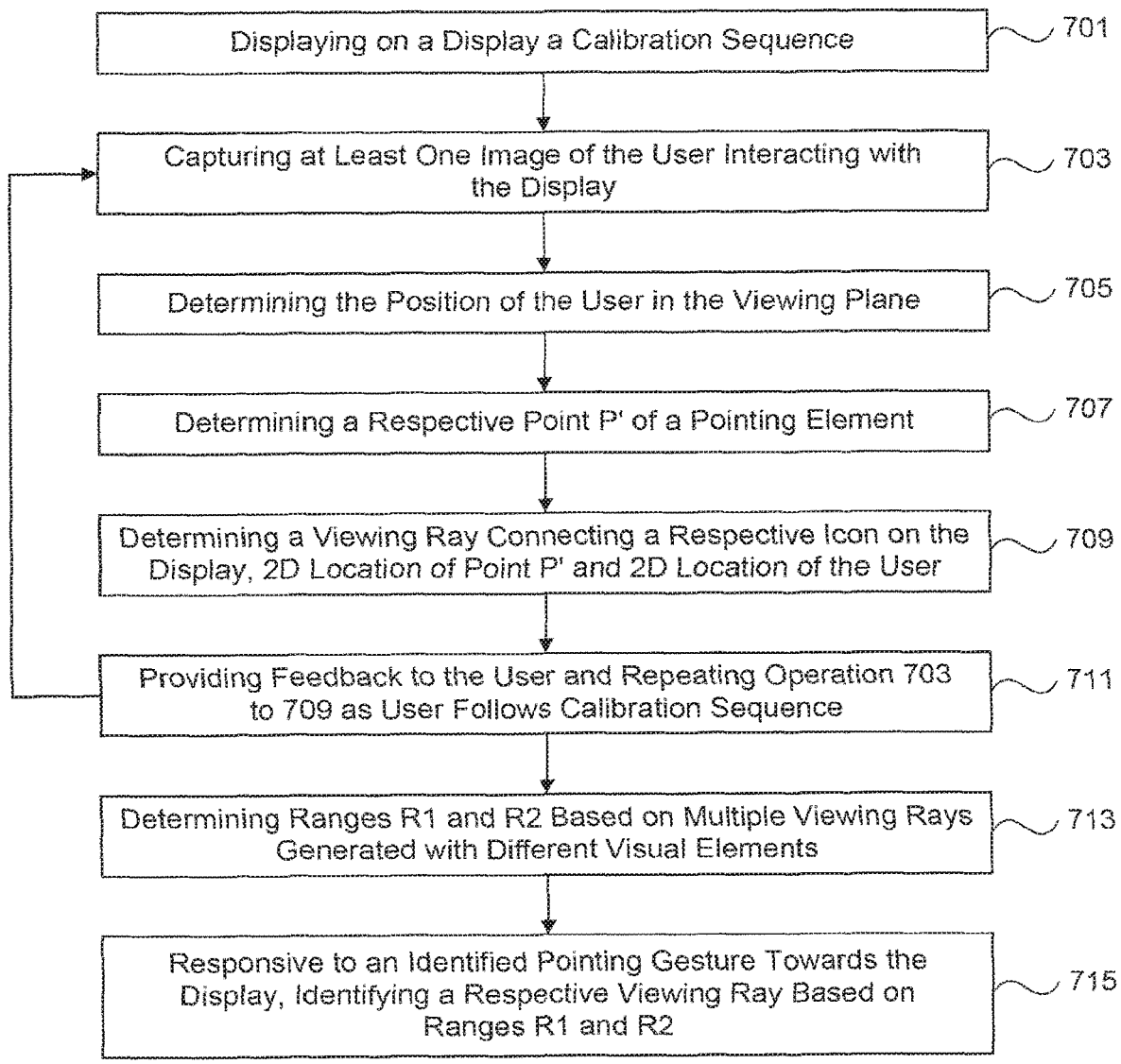
FIG. 7 illustrates exemplary calibration steps that may be used in accordance with methods, systems, and computer readable media associated with embodiments of the invention.

FIG. 7 depicts a flowchart illustrating an exemplary method for performing a calibration process with the processing unit 12 including the calibration module 208. During the calibration process, the distance R1 between the user 16 and the display 6 and the range R2 between the pointing element and user's body may be more accurately estimated. The method includes a step 701, displaying on a display 6 a calibration sequence. During step 701, one or more graphical elements (e.g., icons) may be displayed on the display 6 in a predefined order or shape and may provide a calibration sequence. The calibration sequence may be characterized by the location of icons on the display 6 and the time and/or the sequence of interaction with the different icons. The user 16 may be requested to interact with the icons (e.g., point to or swipe) according to a predefined order. In some embodiments, the calibration sequence may also include an icon to be swiped or moved according to a predefined pattern or shape.

In some cases, the user 16 may be unaware of the calibration process. For example, as mentioned above, the calibration process can be presented to the user 16 as an interaction for unlocking the display 6 (e.g., swiping an icon displayed on the display 6 from left to right). Or calibration may take place during ordinary usage as the user 16 points to displayed icons.

The method may include step 703, capturing at least one image of the user 16 interacting with the display 6. During step 703, the user 16 may interact with the display 6 as requested by the calibration sequence and the image sensor 8 may capture images of the user 16 while doing so. The method may include step 705, determining the position of the user 16 in the viewing plane. During step 705, the location (i.e., x- and y-coordinates) of the user 16 (e.g., the user's eye 22) in an image captured by the image sensor 8 may be determined. The method may include step 707, determining a respective point P' of a pointing element. During step 707, a pointing gesture may identified and a point P', which indicates the location of the pointing element (i.e. x- and y-coordinates) where the pointing element is located closest to the display 6 may be determined.

The method may include a step 709, determining a viewing ray 24 connecting a respective icon on the display 6 to the 2-D location of the point P', and to the 2-D location of the user 16. Since the calibration process may be executed in accordance with a predefined calibration sequence, information indicating which of the graphical elements displayed on the display 6 that the user 16 is currently requested to be pointing, is available to the processing unit 12. Therefore, the processing unit 12 can more easily correlate between the viewing ray 24 connecting the location of the user 16, the point P' and a respective graphical element on the display 6, towards which the user 16 is pointing. Accordingly, a respective viewing ray 24 may extend from the relevant graphical element on the display 6, through the pointing element located at the respective point P', and to the respective location of the user 16.

Figure 8:
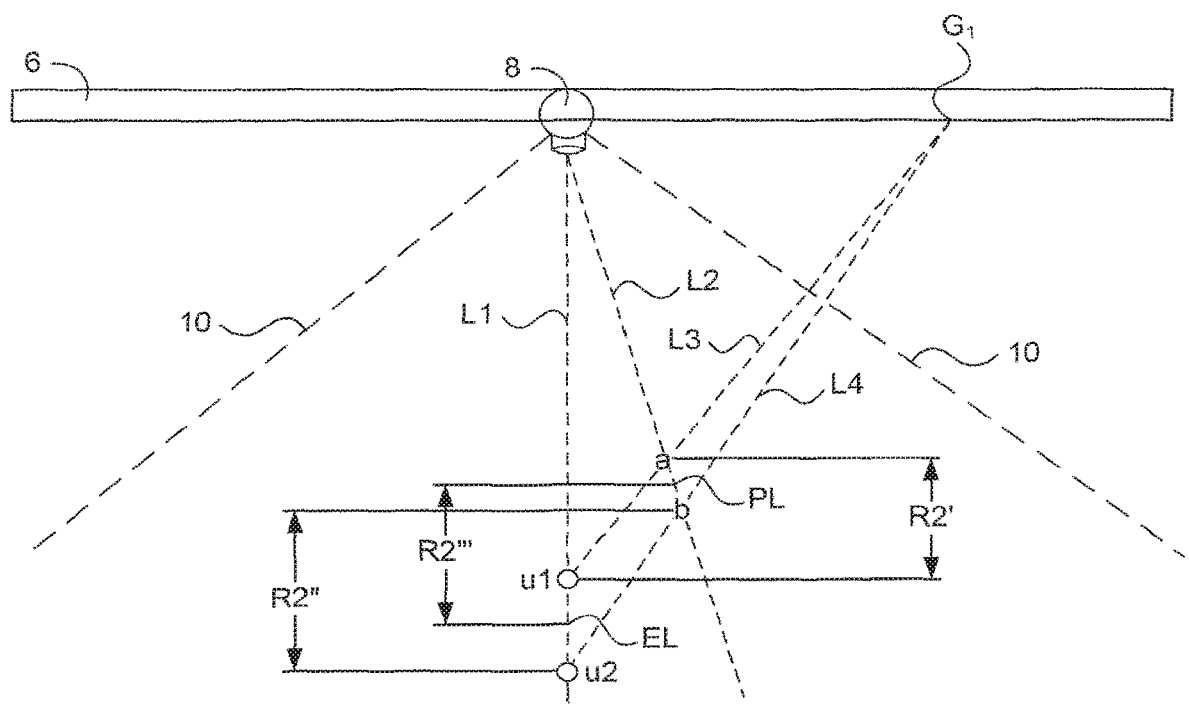
FIG. 8 illustrates an exemplary graphical representation of a touch-free user interface system in accordance with some of the disclosed embodiments.

FIG. 8 is a top view illustration depicting an exemplary calibration process. As shown in FIG. 8, an image sensor 8 may be positioned adjacent to the display 6 and may be capable of capturing images of a 3-D viewing space indicated by the broken lines 10. A user 16 may point towards an icon $G_1$, which is part of a calibration sequence (not shown). The 2-D position of the user 16 standing in front of the display 6 may be located on a line L1. The distance R1 between the user 16 and the display 6 can be estimated as described above; however, the calibration process may enable improvement over this estimation. The 2-D location of the point P' may be located on a line L2. The range R2 extending between the line L1 and the line L2 can be estimated as mentioned above; however, the calibration process may enable improvement over this estimation.

As described above with reference to FIG. 6A, uncertainty may exist with regard to the estimated range R2, as indicated above by the deviation $\Delta r$. Thus, the distance between the line L1 and the line L2 can be estimated to be anywhere between $R2+\Delta r/2$ and $R2-\Delta r/2$. During the calibration process, a first straight line L3 may extend from the icon $G_1$ on the display 6 and connect to the lines L1 and L2, such that the distance between the line L1 and the line L2 equals $R2-\Delta r/2$; and a second straight line L4 may extend from the icon $G_1$ on the display 6 and connect the line L2 and the line L1, such that the distance between the line L1 and the line L2 equals R2+Δr/2. As shown in FIG. 8, the distance between the point a on the line L2 and a point u1 on the line L1 equals R2−Δr/2, and the distance R2" between the point b on the line L2 and a point u2 on the line L1 equals R2+Δr/2.

A point EL on the line L1 may represent the estimated location of the user 16, which may be determined to be any point located between the points u1 and u2. For example, the point EL can be the point located exactly at the middle between the points u1 and u2. A respective point on the line L2 can be determined by extending a straight line from the selected point on the line L1, through the line L2, and to the icon i. The calibration method may include a step 711, providing feedback to the user 16 and repeating steps 703 to 709 as the user 16 follows the calibration sequence. Feedback can be provided to the user 16 by, for example, changing one or more of the color, the size, the shape, and the position of the respective graphical element or by an audible indication. As the user 16 follows the calibration sequence and interacts with the respective graphical elements on the display 6, the steps 703 to 709 may be repeated.

For any icon $G_i$, a respective point $EL_i$ on the line L1 representing the location of the user 16 can be determined as described above. The method may include a step 713, determining the ranges R1 and R2 based on multiple viewing rays generated with different visual elements. During step 713, a final estimation of ranges R1 and R2 may be determined. The final estimation of ranges R1 and R2 can be determined based on all the points EL obtained with respect to the different icons in the calibration sequence (e.g., a point located at the center of all identified points).

The method may include a step 715, responsive to an identified pointing gesture towards the display 6 identifying a respective viewing ray 24 based on the ranges R1 and R2. Step 715 may occur once the system has been calibrated and/or during regular operation.

The processing unit 12 may be configured to determine a different range R2 for each icon on the display 6 and may create a map associating the different icons and their respective locations on the display 6 with a corresponding range R2. Any other point on the display 6 (not populated by a calibration icon) can be associated with the respective range R2 based on the map. This association can be based, for example, on a linear combination of the location of icons and their respective ranges R2.

During regular operation, the processing unit 12 can be configured, responsive to a pointing gesture of a user 16 towards the display 6, to identify the general direction of the pointing gesture, and to select a specific range R2 that is associated with a calibration icon located at a point on the display 6, which is closest to the identified general direction.

In addition to or instead of the calibration process described above, other techniques may be possible to more accurately identify a point or location on the display 6 towards which the user 16 is pointing. As explained above, due to different uncertainties related to parameters used when determining a point on the display 6 towards which the user 16 is pointing, a candidate plane may be identified on the display 6, and may represent a plane, on which a plurality of possible lines extending from the eyes of the user 16, passes through the pointing element, and intersects with the display 6.

Figure 9:
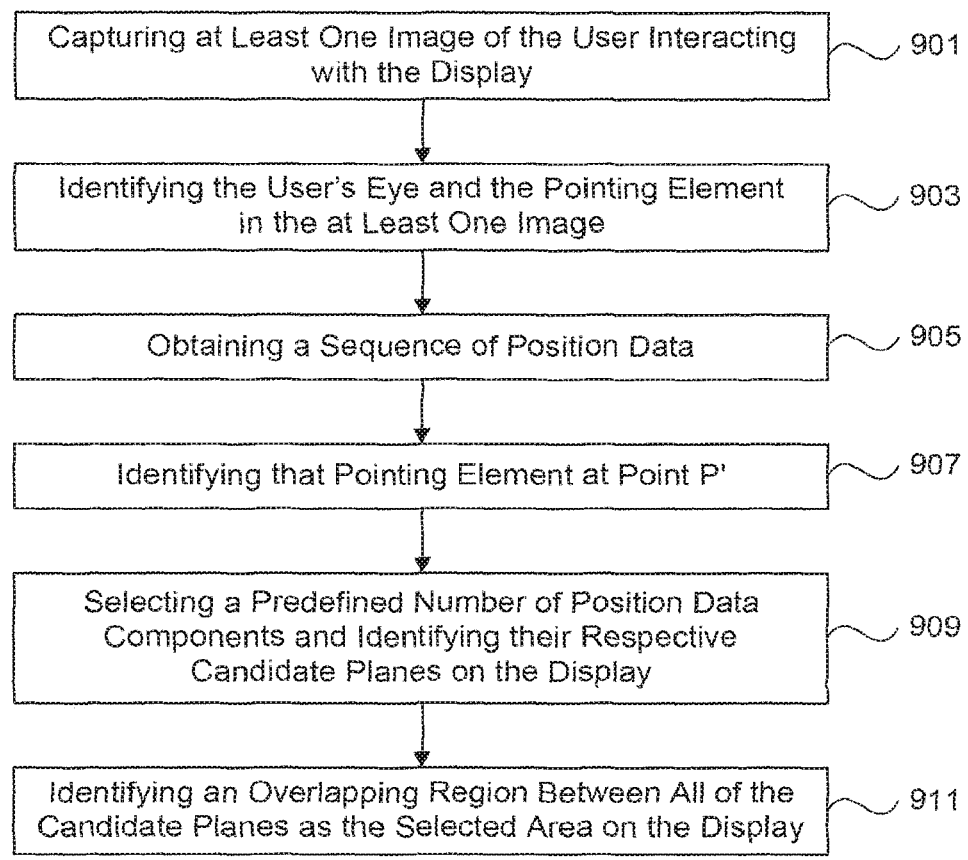
FIG. 9 illustrates exemplary steps for identifying candidate planes or candidate areas that may be used in accordance with methods, systems, and computer readable media associated with embodiments of the invention.

FIG. 9 depicts a flowchart illustrating an exemplary method, which may employ the processing unit 12 including the machine vision unit 210, for reducing the size of the candidate plane and to more accurately identify the point on the display 6 towards which the user 16 is pointing.

The method may include a step 901, capturing at least one image of the user 16 interacting with the display 6. During step 901, the image sensor 8 may capture images of the user 16 attempting to interact with graphical elements displayed on the display 6. The method may include step 903, identifying the user's eye 22 and the pointing element in the at least one image. In particular, the captured images may be processed and the user's eye 22 and the pointing element may be identified in the captured images. The method may include a step 905, obtaining a sequence of position data. During step 905, the motion path of the pointing element may be traced while it is being extended towards the display 6 and a sequence of position values comprising different positions of the pointing element (e.g., the fingertip 14) in the motion path may be obtained.

The position values include parameters that may describe the position of a pointing element in a given image. For example, position values can be x- and y-coordinates of the tip of the pointing element in the viewing plane captured by the image sensor 8. The user 16 may extend his arm closer towards the display 6 and the 2-D position of the fingertip 14 with respect to the viewing plane (indicated by x- and y-coordinates) can be obtained and stored.

While the arm is being extended closer towards the display 6 during a pointing gesture, starting from a certain distance from the display 6 and moving towards a convergence point and onward, the pointing element may point to the same location on the display 6 (e.g., the pointing element may be aligned on a similar viewing ray 24). During this motion path, the image sensor 8 may capture a sequence of images, such that different points of the pointing element that may be aligned on the same viewing ray 24 that passes through the user's eye 22, the pointing element (i.e., the fingertip 14), and the point on the display 6.

The method may include step 907, identifying the pointing element at the point P'. During step 907, the motion of the pointing element (i.e., fingertip 14) may be traced until it has been identified that the pointing element is located at the point P'. At this point, a predefined number of position values may be selected from the sequence of position values extracted from the motion path of the pointing element towards the display 6. The selected position values can be for example, the position values that correlate with the N images (or frames) before the pointing element has reached the point P', which is the closest point to the display 6. Alternatively, the selected position values can be sequential positions located on similar viewing rays.

As discussed above, each position value in the sequence of position values (represented by, for example, x- and y-coordinates on the viewing plane) may be associated with a respective viewing ray 24 connecting the user's eye 22, through the pointing element located at a position indicated by the respective position value, and intersecting the display 6. Because of the uncertainties discussed above, each of the viewing rays may be associated with a respective candidate plane on the display 6.

The method may include a step 909, selecting a predefined number of position data components and identifying their respective candidate planes on the display 6. During step 909, the respective candidate planes may be associated with the selected position values identified on the display 6. The method may include a step 911, identifying an overlapping region between all of the candidate planes as the selected area on the display 6. During step 911, the overlapping region between the candidate planes may be identified and designated as the selected viewing plane, thereby reducing the size of the candidate plane and identifying a smaller area on the display 6 as the point toward which the user 16 is pointing.

Figure 10:
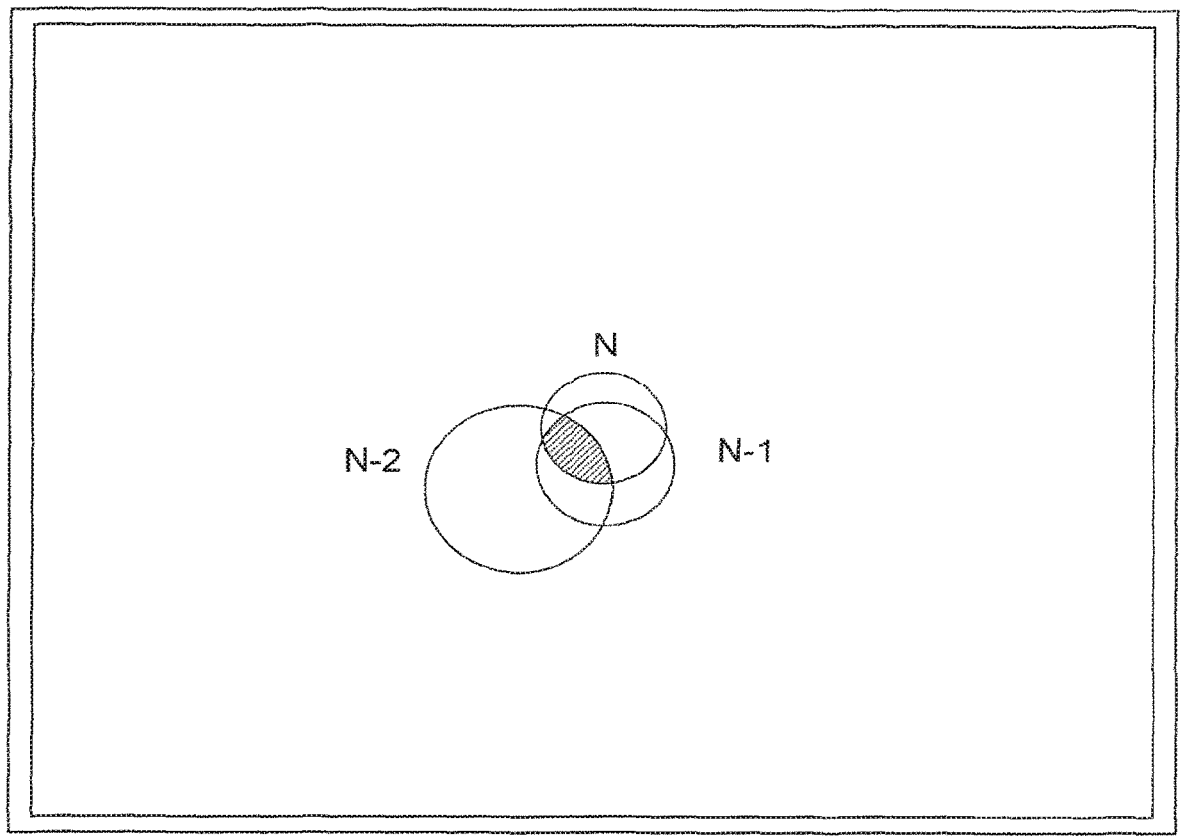
FIG. 10 illustrates a Venn diagram of exemplary candidate planes in accordance with some of the disclosed embodiments.

FIG. 10 depicts an exemplary Venn diagram showing three partially overlapping candidate planes. Each of the three candidate planes is illustrated as a circle covering a certain area or location on the display 6. Each plane is associated with a different position value of the three last position values in a recorded sequence of position values (position values: n, n−1, and n−2).

As discussed above, from the convergence point and onward, each of the three different viewing planes that are associated with different position values in the sequence of position values may cover an overlapping area. As illustrated in FIG. 9, the three candidate planes may point to the same area and share an overlapping portion (shown with a crosshatching pattern), which is designated as the selected projection plane.

Figure 11:
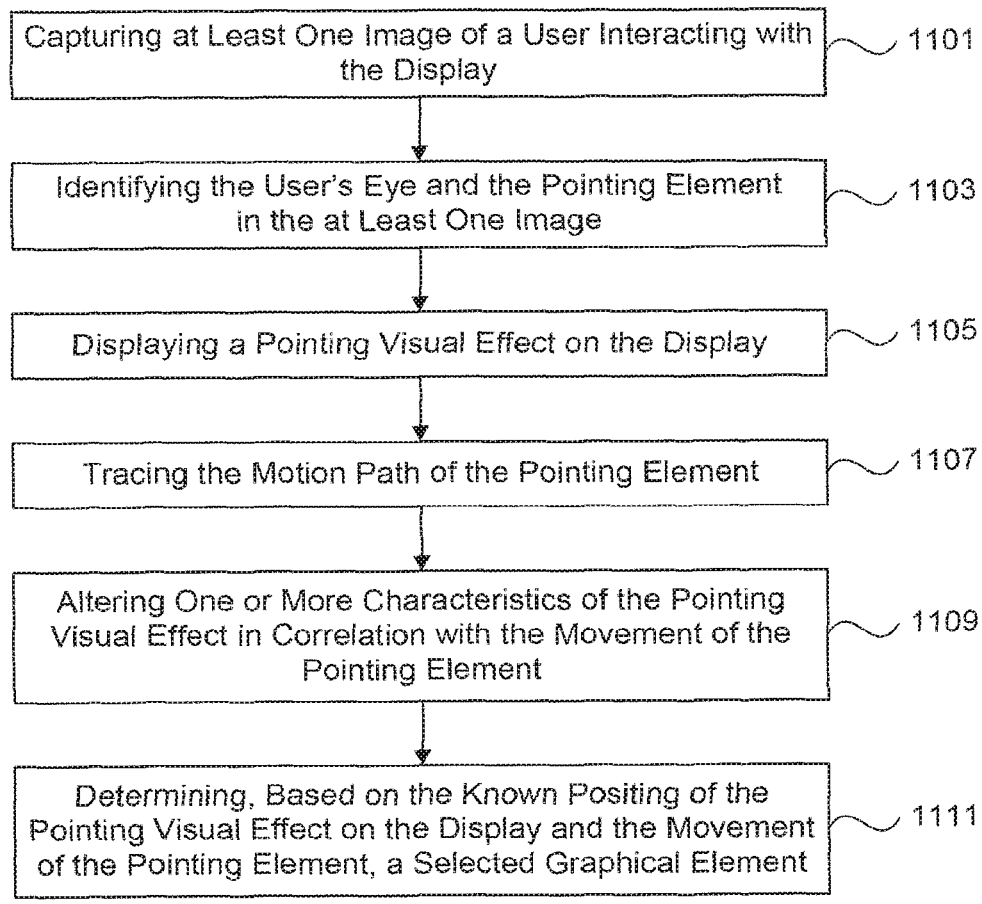
FIG. 11 illustrates exemplary gesture tracking steps that may be used in accordance with methods, systems, and computer readable media associated with embodiments of the invention.

FIG. 11 depicts a flowchart illustrating an exemplary method that may be performed with the processing unit 12. The system 2 may be configured to provide feedback to a user 16 pointing towards the display 6. This feedback may assist the user 16 to direct the pointing element towards a desired point on the display 6 and to more easily select a desired graphical element. The following operations associated with FIG. 11 are provided in the context of a 2-D display, however similar operations may be executed with a 3-D display.

The method may include a step 1101, capturing at one image of a user 16 interacting with the display 6. During step 1101, the image sensor 8 may capture images of the user 16 while attempting to interact with icons displayed on the display 6. The method may include a step 1103, identifying the user's eye 22 and the pointing element in the at least one image. The method may include a step 1105, displaying a pointing visual effect on the display 6. The step 1105 may occur responsive to the detection of a pointing gesture. The pointing visual effect can be, for example, a smudge of color characterized by any shape or color, transparent or opaque, and located at any location with respect to the graphical elements that are displayed on the display 6, which may be on top of or behind the graphical element. For example, the pointing visual effect may have one or more of a round symmetrical shape, a transparent color through which the graphical elements are discernible, and appear to the user 16 as a flashlight beam illuminating a portion of the display 6. The initial location of the pointing visual effect on the display 6 can be determined based on the initial pointing direction of the pointing element.

The method may include a step 1107, tracing the motion path of the pointing element. While tracing the pointing element, a respective sequence of position values can be obtained as described above with reference to step 905 and shown in FIG. 9.

The method may include step 1109, altering one or more characteristics of the pointing visual effect in correlation with the movement of the pointing element. For example, as the pointing element is extended closer towards the display 6 one or more characteristics of the pointing visual effect may be altered in correlation with the movement of the pointing element. The characteristics can include, for example, one or more of the shape, size, and color of the pointing visual effect. For instance, the pointing visual effect can decrease in size as the distance between the pointing element and the display 6 decreases.

As the user 16 extends his arm towards the display 6, the user 16 may intuitively attempt to move the pointing visual effect towards the position of a desired graphical element displayed on the display 6. The rectifying movements of the pointing element, which may be made by the user 16 in an attempt to move the pointing visual effect towards the selected graphical element, may be identified by the processing unit 12. Optionally, the position of the pointing visual effect on the display 6 can change based on the rectifying movement of the user 16. For example, the position of the pointing visual effect on the display 6 can change in correlation with the direction of the rectifying gestures that are made by the user 16.

Figure 16A:
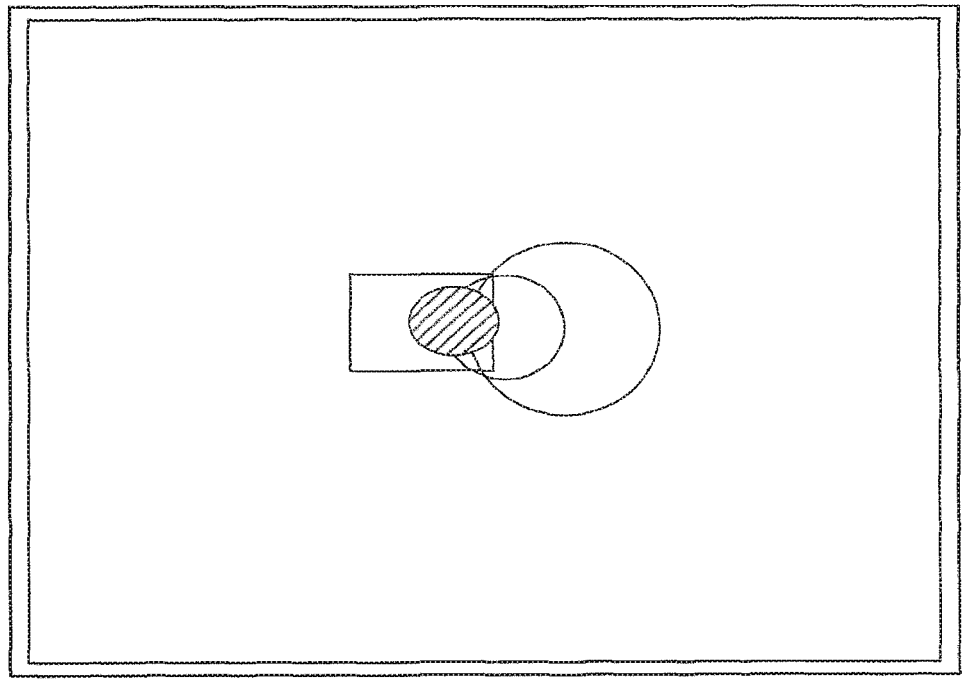
FIG. 16A illustrates an exemplary graphical representation of a pointing visual effect in accordance with some of the disclosed embodiments.
Figure 16B:
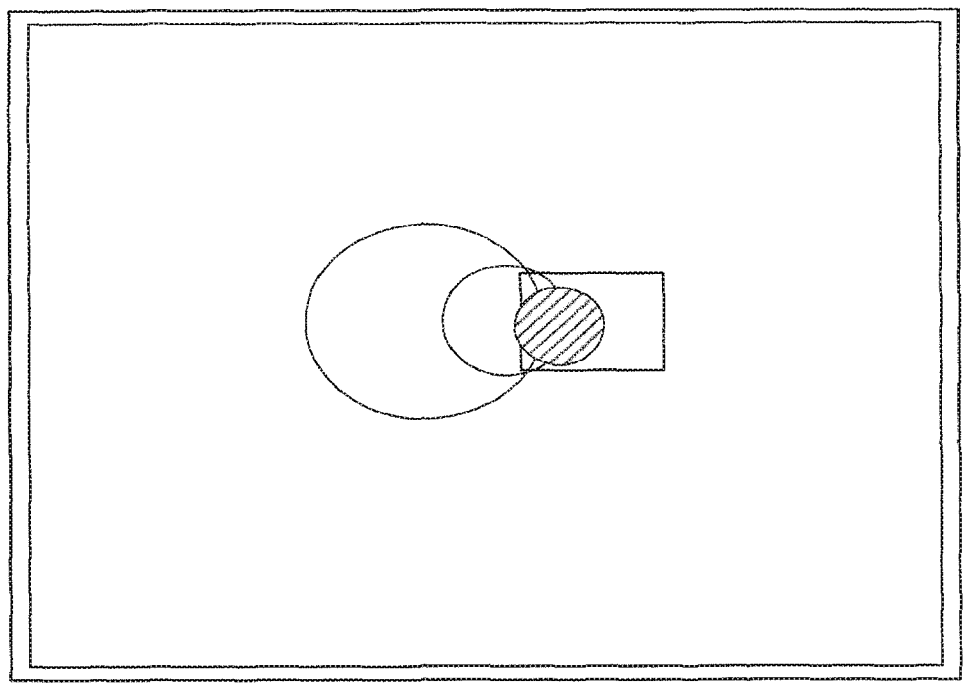
FIG. 16B illustrates an exemplary graphical representation of a pointing visual effect in accordance with some of the disclosed embodiments.

In another example, a circular pointing visual effect may become smaller as the pointing element is brought closer towards the display 6. Optionally the pointing visual effect can decrease in the direction of the rectifying gesture. FIG. 16A illustrates a pointing visual effect which has decreased in size and has migrated to the left in response to a rectifying gesture towards an icon (indicated by the square) located on the left and FIG. 16B illustrates a pointing visual effect which is decreased in size and migrates to the right in response to a rectifying gesture towards an icon (indicated by the square) located on the right.

The method may include a step 1111, determining, based on the known position of the pointing visual effect on the display 6 and on the movement of pointing element, a graphical element. For example, an icon that complies with a predefined criterion with respect to the pointing visual effect can be identified as a selected icon. Furthermore, an icon that is located closest to the smudge or located relative to the smudge in the direction of the rectifying gesture can be determined as the icon selected by the user 16.

As discussed above, the processing unit 12 may be configured to identify a viewing ray 24 extending from the user's eye 22, passing through the tip of the pointing element, and then passing on to the display 6. To this end, the processing unit 12 may be configured to identify the user's eye 22 in the captured images.

Figure 12:
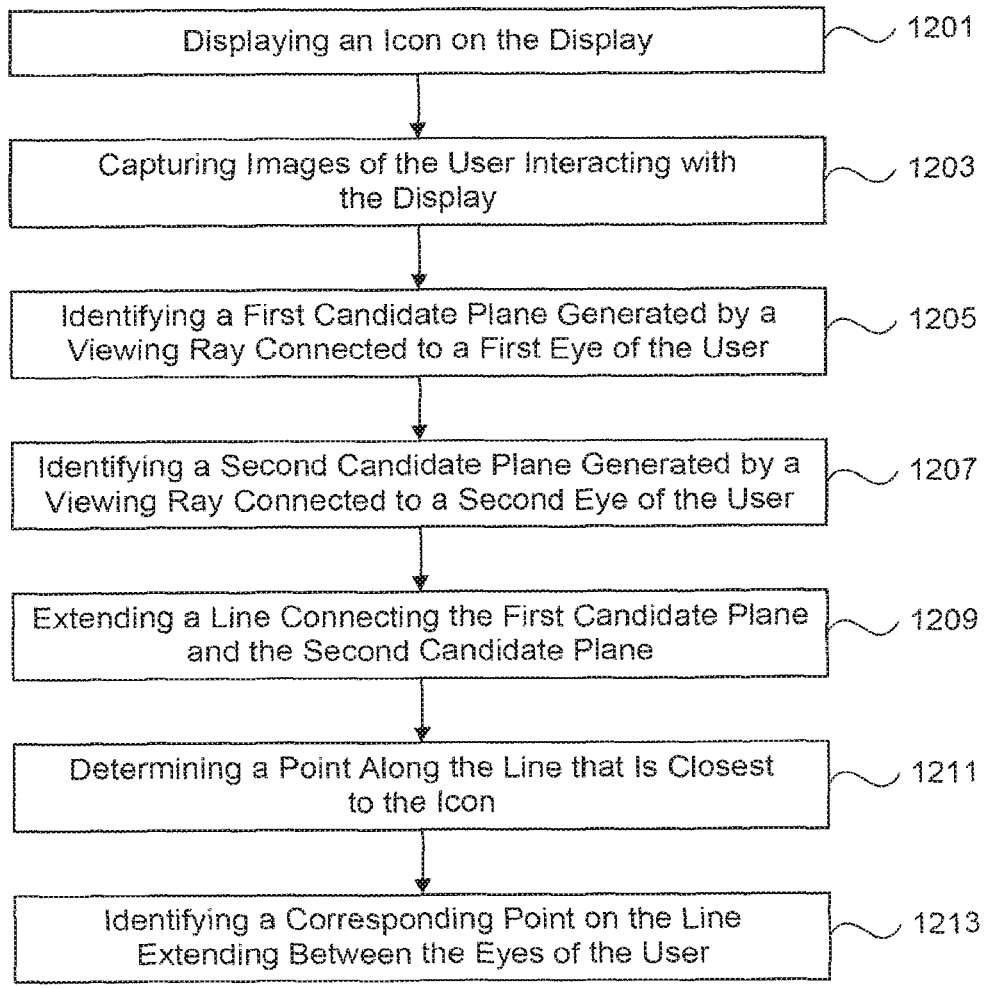
FIG. 12 illustrates exemplary steps for determining eye dominance that may be used in accordance with methods, systems, and computer readable media associated with embodiments of the invention.

FIG. 12 depicts a flowchart illustrating an exemplary method for computing a viewing ray 24 from the user's eye 22 through a tip of a pointing element to a desired location on the display 6 to which the user 16 points by taking into account which one of the user's eyes is dominant when the user 16 points at the display 6. When pointing at a graphical element on the display 6, eye dominance may cause there to be an offset between an actual location of an icon on the display 6 and a location where the user 16 points. In other words, when computing a viewing ray 24 from a mid-point between the user's eyes through a tip of the pointing element, the resulting viewing ray may not intersect with a location of the icon on the display 6. Thus, a first gesturing location differs from a location of the first display information at least in part as a result of one eye of the user 16 being dominant over another eye of the user 16. To correct for this offset, a methods and systems consistent with the invention may compute the viewing ray 24 by using a priori information related to the user's dominant eye. This dominance information may be derived by the system during a calibration or during regular use as the system may know the precise location of a displayed icon, and therefore can determine an offset when a user 16 who is prompted to point at the icon, is detected to be pointing to a location offset from the icon.

A priori information may also be obtained from a database or from the user's conduct, such as during winking. The user 16 may be asked directly for such information, or the user

16 may be asked to wink. During winking, the dominant eye may be revealed as the eye that remains open. Accordingly, the system 2 may compute the viewing ray 24 according to the user's dominate eye and establish with higher accuracy, an estimate of the location that the user 16 points during the different pointing gestures described above.

Moreover, a viewing ray 24 may be extracted from the point on the display 6 to which the user 16 points through the fingertip 14. However, it is possible that it may not reach one of the user's pupils, but instead reach a point somewhere between the two pupils that is related to the more dominant "pointing eye." As discussed above and depicted in FIG. 14 below, due to an offset associated with a dominant eye, the viewing ray 24 or line of sight extends from an offset position (virtual eye $V_e$) relative to the icon, through the pointing element, and to a position between the pupils on the user's face. Therefore, it may be advantageous to establish a more accurate starting point between the user's eyes from which to compute the viewing ray 24, rather than anchoring a starting point from one of the user's pupils.

However, in reality, the viewing ray 24 may intersect any point located on an imaginary line extending between the two eyes of the user 16, at a point which can overlap with either the left eye or the right eye or any other point therebetween. In order to more accurately determine gesturing location 19, the point on the display 6 to which a given viewing ray 24 extends, it might be advantageous to determine a more accurate point that represents the "virtual eye" of the user 16 corresponding to a viewing ray 24 associated with an intended display location to which the user intends to point, rather than arbitrarily choosing one of the user's right or left eyes or any point on the line that connects them.

In more detail, FIG. 12 depicts an exemplary method for determining a reference point between the user's eyes with the processing unit 12 including the calibration module 208. The reference point may represent a more accurate intersection point of a given viewing ray 24 with a line of sight extending between the eyes (e.g., pupils) of the user 16. The process described with reference to FIG. 12 can be performed, for example, as a onetime calibration process or may be updated periodically.

The method may include a step 1201, displaying an icon on the display 6. The method may include a step 1203, capturing images of the user 16 interacting with the display 6. The images captured in step 1203 may be captured by the image sensor 8.

Optionally the user 16 may be instructed or prompted to point towards the icon displayed on the display 6. The instructions can be provided to the user 16 on the display 6, as an audible instruction, as part of the calibration process, or simply as a display of information requiring interaction. The method may include a step 1205, identifying a first candidate plane generated by a viewing ray connected to a first eye of the user 16. During step 1205, a pointing gesture of the user 16 towards the display 6 may be identified and a first viewing ray connecting one of the user's eyes, through the pointing element, and a first gesturing location on the display 6 may be determined and a respective candidate plane may be identified on the display 6.

The method may include a step 1207, identifying a second candidate plane generated by a viewing ray connected to a second eye of the user 16. During step 1207, a pointing gesture of the user 16 towards the display 6 may be identified and a second viewing ray connecting the other one of the user's eyes, through the pointing object, to a second gesturing location on the display 6 may be determined and a respective candidate plane may be identified on the display 6. As discussed above, the first and second candidate planes can be determined based on the methods described above, but in particular, the first and second candidate planes can be determined, in part, based on the distance R1 between the user 16 and the display 6 and the estimation of extension range R2 between the pointing element and the location of the pointing element in the viewing plane.

Figure 13:
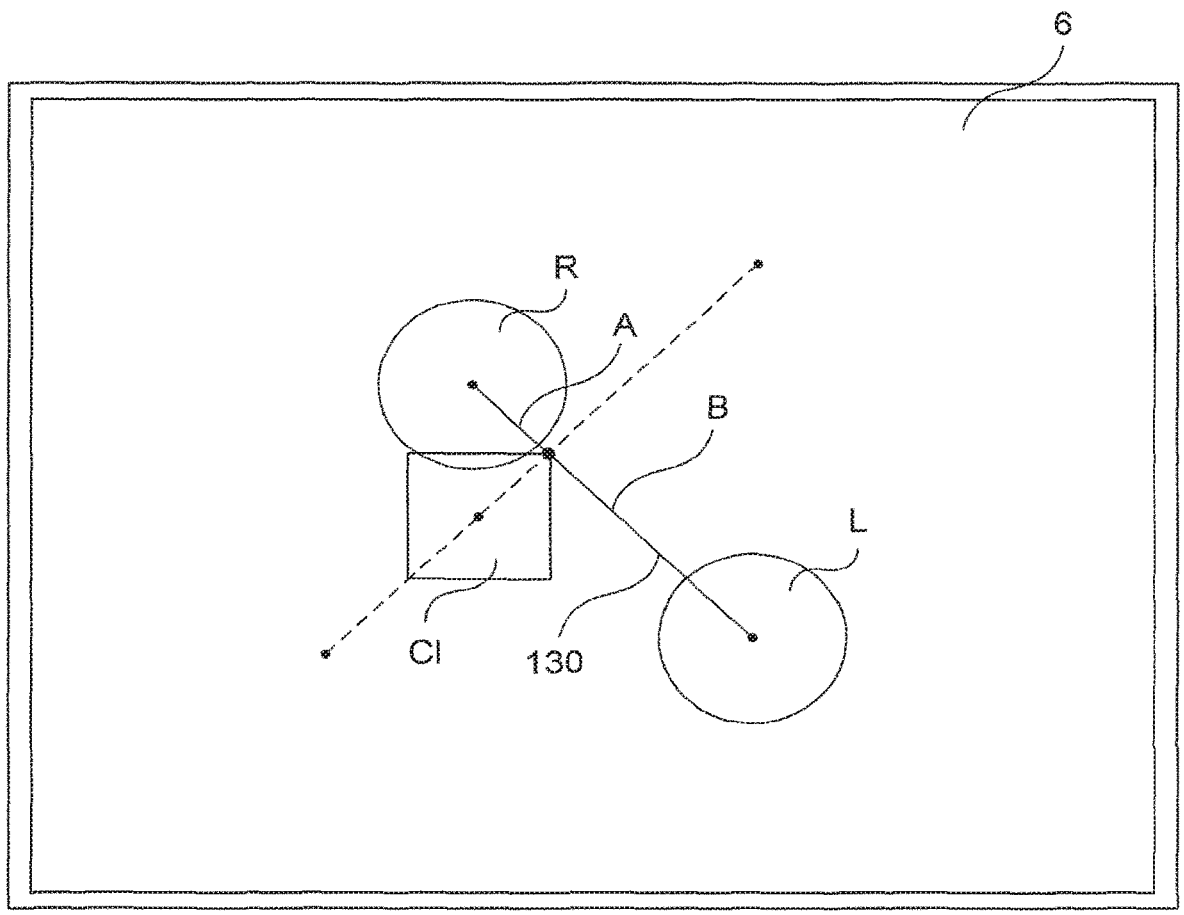
FIG. 13 illustrates an exemplary graphical representation of a touch-free user interface system in accordance with some of the disclosed embodiments.

FIG. 13 is a schematic illustration showing calibration icon CI, which may be displayed on display 6. FIG. 13 further illustrates two candidate planes, of which, one may be generated by a viewing ray connecting the left eye of the user 16 (indicated by the letter L) and the other may be generated by a viewing ray connecting the right eye of the user 16 (indicated by the letter R). Note, that in the illustrated example shown in FIG. 13, a portion of candidate plane R overlaps the calibration icon CI, unlike the candidate plane L.

Figure 14:
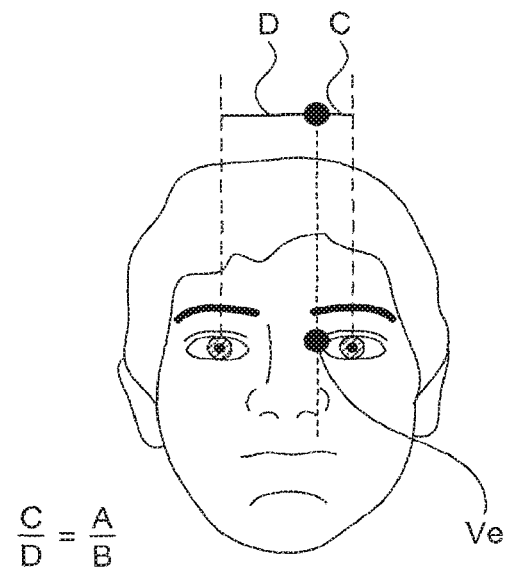
FIG. 14 illustrates an exemplary graphical representation of a user's face in accordance with some of the disclosed embodiments.

Based on the location of each of the two candidate planes with respect to the location of the icon, the processing unit 12 can be configured to determine which of the two eyes is more dominant and may determine the offset O associated with the gesturing location 19. The system 2 may use that eye, or "the virtual eye" while determining additional gesturing locations. The processing unit 12 may be configured to indicate through information pertaining to the offset O, which eye is more dominant. Furthermore, the processing unit may be configured to indicate a degree of dominance between the left and right eyes, which may be based on, for example, a percentage of overlap of the candidate planes L and R with the calibration icon CI and/or relative position of the "virtual eye" with respect to the user's eyes, i.e., a ratio of the distance between a "virtual eye" Ve and one of the left and right eyes of the user with respect to the total distance between the left and right eyes of the user. The method disclosed with respect to FIG. 12 may also include a step 1209 of extending a line connecting the first candidate plane and the second candidate plane. According to one example, illustrated with reference to FIG. 12, a line 130 (as shown in FIG. 13) can be extended between the center of candidate plane L and the center of candidate plane R. The method may include a step 1211, determining a point along the 130 line (or close to the line 130, i.e., in the general vicinity) that is closest to the icon CI. For example, a third point on the line 130 located closest to the center of the calibration icon CI (e.g., which may be the target that the user 16 points towards), is identified. The point closest to the calibration icon CI may divide the line 130 into segments A and B. In the example shown in FIG. 13, the segment A may extend from the point closest to the calibration icon CI to the gesturing location 19 determined by calculating a line of sight "starting" from the left eye of the user 16, toward the pointing element (e.g., fingertip 14) and intersecting with the display 6. The gesture location may be also defined as the center of the plane L. Also, the segment B may extend from the point closest to the calibration icon CI to the center of the gesturing location determined by calculating a line of sight "starting" from the right eye of the user 16, toward the pointing element (e.g., fingertip 14) and intersecting with the display 6. The gesture location may be also defined as the center of the plane R. The method may include a step 1213, identifying the corresponding point Ve (or a "virtual eye") on the line extending between the eyes or the pupils of the user 16 (as shown in FIG. 14).

The point Ve may divide the line extending between the eyes of the user 16 into segments C and D. For example, segment C may extend from the point Ve to the user's left pupil, and segment D may extend from the point Ve to the user's right pupil. The position of the point Ve on the line extending between the eyes or the pupils of the user 16 may be determined by interpolating the position of the point Ve, such that the proportion of A/B equals the proportion of C/D.

Processing unit 12 may be configured to use the corresponding point Ve as the point of intersection with the face of the user 16 when identifying viewing rays. It should be noted that this process can take place every time a calibration takes place, to reach more collected values in order to fine tune the location of the "virtual eye," and to fine tune it according to different locations of the user 16 with respect to the display 6

Optionally, the operations described with reference to FIG. 12 can be repeated with a plurality of icons, each of them located at a different position on the display 6. Accordingly, a different respective point Ve between the eyes can be identified for processing pointing gestures directed to different areas or locations on the display 6.

The "virtual eye" location and/or the "virtual eye" mapping information, can be stored in memory (on the device 4, or external to the device 4) associated with every specific user 16 to be used in later time by system 2, or by other devices using the system 2. When the system 2 identifies the user 16 (for example, by face recognition, user voice signature, or expressly identified by the user 16) the system 2 may retrieve the stored information indicating the location of the "virtual eye" and/or the "virtual eye" mapping information. The "virtual eye" and/or the "virtual eye mapping information" that is stored for each user 6 may include unique identity information obtained by the image sensor 8, and may include information regarding offsets associated with each user 6. For example, the stored information for each user 6 may include facial information including the location of facial features, such as the user's eyes, including the user's pupils. In addition, the offset information saved for each user, may include offset information of the user 6 with respect to the user's eyes, including the user's pupils.

Figure 15:
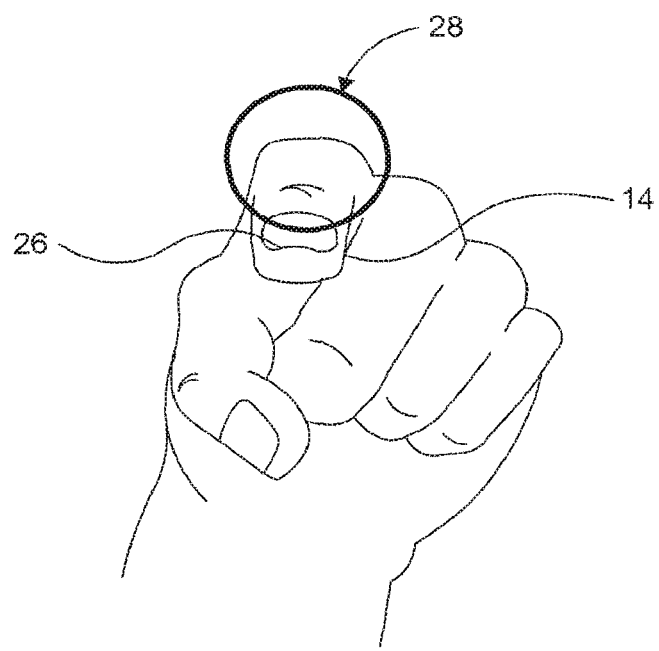
FIG. 15 illustrates an exemplary graphical representation of a user's hand in accordance with some of the disclosed embodiments.

Embodiments of the invention may include storing one or more offsets, which are associated with vectors representing the difference on the display 6 between a gesturing location 19 and the location on the display 8 the user 16 is perceived to be pointing. For example, the distance from the center of candidate plane R and the center of the icon the user 16 was prompt to point at. Then, when the user 16 performs subsequent touch-free gestures, the system 2 may use the stored offsets to correct the gesturing location 19 in order to correctly determine the displayed information (icon) at which the user is pointing. The system 2 may store multiple offsets associated with different regions of the display, and may use an appropriate one of the stored offsets according to the gesturing location 19. Embodiments of the invention may enable identification of the pointing element of a user 16, such as the fingertip 14. Features of a hand may help identify the fingertip 14 or any other pointing element that may be held in the hand, or worn on the hand. FIG. 15 depicts a hand of a user, including the fingertip 14, a fingernail 26 on the fingertip 14, and an index finger knuckle 28.

A method for determining a pointing element may include determining whether the pointing element is a part of or associated with the user's right or left hand. From images captured by the image sensor 8, it may readily be determined which hand the user 16 moves when performing a gesture. The method may include a step of determining the fingernail 26 on the fingertip 14 of the pointing finger. Alternatively or in addition to determining the fingernail 26 of the fingertip, the method may detect the index finger knuckle 28 on a left portion of the hand if the user 16 points with the right hand, and on a right portion of the hand if the user 16 points with the left hand. Alternatively, the system may be configured to detect a signature of a group of knuckles, such as the knuckles on the third, fourth and fifth fingers. The system might also detect the folded thumb, illustrated in FIG. 15, which is characteristic of a pointing hand. This may be useful because, as illustrated in FIG. 15, a tip of a pointing figure is less distinct in its recognizable features from other more distinct portions of the hand. However, once the more distinct portions of the hand are located, a location of the fingertip may be extrapolated.

More specifically, extrapolation can occur through measurement or estimation of the width, height, and/or location of the hand with respect to the user's face. This data may help estimate the particular anatomy and dimension of the user's hand, and thus aid in predicting the location of the fingertip 14, if it is not readily apparent from the captured images. Further, known relationships between the spacing of the fingers may help improve the estimation. Jewelry, such as one or more rings may be used as reference points to determine the location of the fingertip 14. Reference data saved in memory 13 for a particular user 16 or average anatomical data may assist in improving the estimation. Any of the reference data discussed above may be used in an algorithm associated with identifying a pointing location. The reference point may include, for example, a central location of the hand, jewelry, any of the fingernails (including the fingernail 26 on the fingertip 14), and one or more knuckles, such as index finger knuckle 28. Once a reference point has been identified, the algorithm may calculate an offset distance in x- and y-coordinates or in x-, y-, and z-coordinates as an estimate location of the fingertip 14 with respect to the reference point. The method may identify and track one or more of the reference points and apply the corresponding offset associated with the reference point to estimate the location of the fingertip 14.

Other embodiments of the invention may include a device for calibrating a touch-free gesture recognition system, the device may include at least one processor, configured to: enable presentation of a prompt to a user to make a touch-free gesture at at least one prompt location on a display; receive information from a camera indicating a corresponding gesturing location on the display, wherein the gesturing location differs from the at least one prompt location as a result of a non-alignment between the gesturing location on the display and an intended gesturing location of the user; and calibrate the gesture recognition system to account for the non-alignment.

In addition, in the device for calibrating a touch-free gesture recognition system the at least one processor may be further configured to: use the touch-free gesture for at least one operation in addition to the calibrating; enable the prompt to occur during use of an application without identifying to the user that calibration is occurring; increase gesture location accuracy periodically during use of an application by periodically recalibrating the gesture recognition system to account for differences between detected locations of gesturing on a display during use and locations of icons on the display that the user is suspected of attempting to select; predict a user's intent to activate a specific icon based on proximity of the gesturing location on the display to the specific icon, and to calibrate based on the prediction; permit periodic recalibrating during normal use of the application without unique calibration steps required by the user, delay the calibration until after the user performs a subsequent action following the touch-free gesture at the at least one prompt location; increase the gesture location accuracy by recalibrating during an appliance unlocking process; determine, based on a layout of icons on the display, whether a user's intent is to activate a specific icon when there is a difference between icon location and the gesturing location; prompt the user to unlock the associated appliance after detection of a predefined user movement relative to the display; save information related to a plurality of pointing locations and relative locations of icons associated with each of the plurality of pointing locations, and calibrate the gesture recognition system using the saved information; save information related to the gesturing location and a relative location of an icon associated with the gesturing location, and/or calibrate the gesture recognition system on the saved information; and calibrate, during an unlocking process, to account for unique characteristics of the user's vision.

In addition, in the device for calibrating a touch-free gesture recognition system the prompt may include at least one icon for cuing the user to unlock an associated appliance or at least one icon, wherein the touch-free gesture is a pointing gesture, and wherein the at least one processor is further configured to cue the user to point at the at least one icon. The at least one prompt location on the display may include a first known location and a second known location, and wherein calibrating is based on information associated with prompting the user to gesture from the first known location to the second known location. The predefined user movement may include at least a body portion of the user moving out of a viewing area of the camera.

The gesturing location may be a pointing location, and wherein the at least one processor may be further configured to: initially calibrate the gesture recognition system based on the pointing location and a location of at least a first icon; after initial calibration, enable the user to control an application using gesturing; during control of the application, gather information relating to the gesturing relative to at least a second icon on the display; and/or recalibrate during control of the application when the user attempts to point at the at least second icon.

The non-alignment may be a result of one eye of the user being dominant over another eye of the user, and wherein the at least one processor may be further configured to: calibrate the gesture recognition system to account for the one eye of the user being dominant over the other eye of the user; determine an offset between the gesturing location and the at least one prompt location; and/or determine an adjustment to apply to subsequent gesturing location determinations based on the offset.

Other embodiments of the invention may include a touch-free gesture recognition system, including at least one processor, configured to: enable presentation of a prompt to a user to make a touch-free pointing gesture at at least one prompt location on a display; receive image information from an image sensor corresponding to the touch-free pointing gesture; determine a fingertip location associated with the touch-free pointing gesture, the fingertip location being determined, at least in part, based on an anatomical feature of the user other than a tip of the user's finger; and determine a pointing location on the display associated with the touch-free gesture based, at least in part, on the determined fingertip location.

The touch-free gesture recognition system may also include at least one memory device for storing a plurality of algorithms for determining pointing locations based on differing hand orientations, and wherein the at least one processor is further configured to select a preferred algorithm from the plurality of algorithms based, at least in part, on a hand orientation in the image information, and to determine the pointing location based, at least in part, on the preferred algorithm.

The touch-free gesture recognition system may also include at least one memory device for storing a plurality of algorithms for determining pointing locations based on whether a right hand or a left hand is detected in the image information, and wherein the at least one processor is further configured to: select a preferred algorithm from the plurality of algorithms based, at least in part, on whether the right hand is detected or the left hand is detected, and to determine the pointing location based, at least in part, on the preferred algorithm; and/or determine whether the hand of the user hand is a left hand or a right hand based, at least in part, on an offset between the anatomical feature of the user and at least a portion of the user's hand.

In the touch-free gesture recognition system, the anatomical feature: may include a fingernail; may be at least one of a width, length, size, or location of a hand of the user; and/or may be a second fingertip other than a fingertip used in the pointing gesture, and wherein the at least one processor is further configured to determine the fingertip location based, at least in part, on the fingertip used for pointing and the second fingertip.

In the touch-free gesture recognition system, the at least one processor may be further configured, in an absence of locating the fingertip in the image information, to: determine the fingertip location based, at least in part, on a predefined area of a hand of the user other than a fingertip; and/or determine the fingertip location based, at least in part, on an estimated length of a finger used for pointing.

In the touch-free gesture recognition system, the at least one processor may be further configured to: determine whether a hand in the image information is a left hand or a right hand, and determine the fingertip location as a location associated with a top-left area of the hand if a right hand is determined or a top-right area of the hand if a left hand is determined; locate a hand by applying to the image information a filter mask associated with a size of the hand; detect two fingers of a hand of the user in the image information, and determine the fingertip location as a location between the two fingers; and/or detect a plurality of fingers of a hand of the user in the image information, determine the fingertip location based, at least in part, on the plurality of fingers, wherein each of the plurality of fingers is associated with a differing weight for determining the fingertip location.

In the touch-free gesture recognition system, the at least one processor may be further configured, after determining the fingertip location at a first time in an absence of locating the fingertip in the image information, to subsequently track the fingertip using non-fingertip information.

In the touch-free gesture recognition system the at least one processor is further configured, after locating the fingertip location at a first time, but failing to locate the fingertip location at a second time, to subsequently track the fingertip using the fingertip location at the first time and non-fingertip information.

Other embodiments of the invention may include a device for providing visual feedback in a touch-free gesture recognition system, the device comprising: at least one processor configured to: enable presentation of an image on a display; receive information from a camera, the information being indicative of a touch-free gesture performed by a user; enable presentation of a gesturing indicator on the display, wherein the gesturing indicator is indicative of a location of the user's touch-free gesture relative to the display; present the gesturing indicator in a first visual appearance on the display when the user's touch-free gesture is a first distance from the display; and present the gesturing indicator in a second visual appearance on the display when the user's touch-free gesture is a second distance from the display, different from the first distance.

In the touch-free gesture recognition system the gesturing indicator may be a pointing indicator. The information received from the camera may be reflective of at least a portion of the user's hand. The image on the display includes at least one icon.

In the touch-free gesture recognition system the at least one processor may be further configured to: decrease a size of the gesturing indicator as the distance of the user's touch-free gesture from the display decreases; increase a size of the gesturing indicator as the distance of the user's touch-free gesture from the display increases; detect a corrective movement associated with the user's touch-free gesture, and to determine a user's intent to select the icon based on the corrective movement; present the gesture indicator only after a portion of the gesture has been detected and/or when a hand of the user is detected in a predetermined area in the field of the image sensor; present the gesture indicator only after a detected location of the gesture motion relative to the display falls within a predetermined threshold; increase a size of the gesturing indicator as the distance of the user's touch-free gesture from the display decreases; and/or decrease a size of the gesturing indicator as the distance of the user's touch-free gesture from the display increases.

In the touch-free gesture recognition system the display may be a virtual 3D display, and wherein the at least one processor may be further configured to: cause a distance between the gesture indicator and the display to change as a distance between the user's hand and the display changes; cause the virtual 3D indicator to appear as if emanating from at least a portion of the user's hand; decrease the size of the virtual 3D indicator as the distance of the user's touch-free gesture from the display decreases; and/or display the gesturing indicator in two forms, a first for prior to a selection of information on the display, and a second form after selection of information on a display.

It will also be understood that the system 2 according to the presently disclosed subject matter may include a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

What is claimed is:

1. A touch-free gesture recognition system, comprising:
at least one processor, configured to:
enable presentation of first display information to a user to prompt a first touch-free gesture at at least a first location on a display;
obtain at least two images of a viewing space of an image sensor;
process the at least two images to obtain data indicative of at least two locations of at least one pointing element in the viewing space;
process the at least two images to obtain data indicative of a location associated with a first eye of the user and a location associated with a second eye of the user;
identify a first candidate pointing area on the display associated with a first line of sight passing from the location associated with the first eye of the user, through the at least one pointing element, and onto the display;
identify a second candidate pointing area on the display associated with a second line of sight passing from the second location associated with the second eye of the user, through the at least one pointing element, and onto the display;
determine an aimed point or area on the display, using the data indicative of the at least two locations of at least one pointing element, the data indicative of the location of the first candidate pointing area, and the data indicative of the location of the second candidate pointing area; and
initiate an action corresponding to the aimed point or area on the display.

2. The system of claim 1, wherein the at least one pointing element includes pointing finger and wherein the at least one processor is further configured to detect a fingertip to determine the aimed point or area on the display based on the detection.

3. The system of claim 1, wherein at least one of the location of the first candidate pointing area or the location of the second candidate pointing area differs from the aimed point or area on the display at least in part as the result of one eye of the user being dominant over another eye of the user.

4. The system of claim 1, wherein the at least one processor is further configured to determine a first offset by identifying at least one of the first candidate pointing area generated using at least one of the first line of sight associated with the first eye of the user and the second candidate pointing area generated using the second line of sight associated with the second eye of the user.

5. The system of claim 1, wherein the information associated with the first offset corresponds to a non-pupil location on a face to serve as a starting point for a line of sight calculation, and wherein the at least one processor is further configured to use the non-pupil location on the face to determine the aimed point or area on the display.

6. The system of claim 1, wherein the at least one processor is further configured to determine the aimed point or area on the display by determining at least a third point in the general vicinity of the identified first candidate pointing area and the second candidate pointing area.

7. The system of claim 1, wherein the at least one processor is further configured to determine differing offsets associated with eye dominance for differing regions of the display.

8. The system of claim 1, wherein the at least one processor is further configured to determine the aimed point or area on the display a by using multiple candidate pointing areas on the display at a plurality of differing time intervals.

9. The system of claim 1, wherein the at least one processor is further configured to store unique information associated with the first offset for each of a plurality of users.

10. The system of claim 9, wherein the at least one processor is further configured to store, as the stored unique information, information received from the at least one image sensor associated with an identity for each of the plurality of users.

11. The system of claim 9, wherein the at least one processor is further configured to:
store, as the stored unique information, information related to a non-pupil location on a face for each of the plurality of users; and
determine the aimed point or area on the display using the stored unique information.

12. The system of claim 1, wherein the information associated with the first offset includes an indication that the one eye of the user is dominant over the other eye of the user.

13. The system of claim 1, wherein the information associated with the first offset includes an indication of a degree to which the one eye of the user is dominant over the other eye of the user.

14. A non-transitory computer-readable medium comprising instructions that, when executed by at least one processor, cause the at least one processor to perform operations including:
enabling presentation of first display information to a user to prompt a first touch-free gesture at at least a first location on a display;
obtaining at least two images of a viewing space of an image sensor;
processing the at least two images to obtain data indicative of at least two locations of at least one pointing element in the viewing space;
processing the at least two images to obtain data indicative of a location associated with a first eye of the user and a location associated with a second eye of the user;
identifying a first candidate pointing area on the display associated with a first line of sight passing from the location associated with the first eye of the user, through the at least one pointing element, and onto the display;
identifying a second candidate pointing area on the display associated with a second line of sight passing from the second location associated with the second eye of the user, through the at least one pointing element, and onto the display;
determining an aimed point or area on the display, using the data indicative of the at least two locations of at least one pointing element, the data indicative of the location of the first candidate pointing area, and the data indicative of the location of the second candidate pointing area; and
initiating an action corresponding to the aimed point or area on the display.

15. The non-transitory computer-readable medium of claim 14, wherein at least one of the location of the first candidate pointing area or the location of the second candidate pointing area gesturing location differs from the aimed point or area on the display at least in part as the result of information indicative of one eye of the user being dominant over another eye of the user.

16. The non-transitory computer-readable medium of claim 14, wherein the instructions, when executed by the at least one processor, further causes the at least one processor to perform an additional operation including determining a first offset by identifying at least one of the first candidate pointing area generated using at least one of the first line of sight associated with the first eye of the user and the second candidate pointing area generated using the second line of sight associated with the second eye of the user.

17. The non-transitory computer-readable medium of claim 14, wherein the information associated with the first offset corresponds to a non-pupil location on a face to serve as a starting point for a line of sight calculation, and wherein the instructions, when executed by the at least one processor, further causes the at least one processor to perform an additional operation including using the non-pupil location on the face to determine the aimed point or area on the display.

18. The system of claim 4, wherein the at least one processor is further configured to determine a degree of dominance between the first and second eyes based on:
a percentage of overlap of the first candidate pointing area and the second candidate pointing area with a calibration icon, or
a ratio of a distance between a virtual eye and one of the first and second eyes with respect to a total distance between the first and second eyes,
wherein the virtual eye corresponds to a facial location of the user other than a pupil of the first eye or the second eye.

19. The system of claim 1, wherein each of the first and second candidate pointing areas comprises at least one pixel.

20. The system of claim 2, wherein the at least one processor is further configured to detect a fingernail on the fingertip to determine the aimed point or area on the display based on the detection.

21. The system of claim 2, wherein the at least one processor is further configured to detect an index finger knuckle of the pointing finger to determine the aimed point or area on the display based on the detection.

22. The system of claim 1, wherein the at least one processor is further configured to:
determine the pointing element associated with a right hand of the user and a left hand of the user; and
use the determination to obtain the data indicative of at least two locations of at least one pointing element in the viewing space.

23. The system of claim 1, wherein the at least one processor is further configured to initiate feedback indication associated with the data indicative of at least two locations of at least one pointing element in the viewing space and the aimed point or area on the display, wherein the feedback indication is at least one of a visual indication, an audio indication, a tactile indication, an ultrasonic indication, or a haptic indication.

24. The system of claim 1, wherein the at least one processor is further configured to detect at least two pointing elements, and determine the aimed point or area on the display using the data indicative of the location of the at least two pointing elements.

25. The system of claim 24, wherein the at least one processor is further configured to detect a motion between the at least two pointing elements, and initiate an action corresponding to the detected motion between the at least two pointing elements and the aimed point or area on the display.

26. The system of claim 25, wherein initiating the action comprises modifying information displayed on the display.

27. The system of claim 25, wherein initiating the action comprises at least one of grasping a graphical element, performing a clockwise gesture or a counter-clockwise gesture over a graphical element, zooming-in on an area on the display, zooming-out on an area on the display, or rotating an area on the display.

28. The system of claim 1, wherein the at least one processor is further configured to determine differing offsets associated with eye dominance for differing locations in a field of view of the user.

* * * * *